USOO5820386A

United States Patent [19]
Sheppard, II

[11] Patent Number: 5,820,386
[45] Date of Patent: Oct. 13, 1998

[54] INTERACTIVE EDUCATIONAL APPARATUS AND METHOD

[76] Inventor: Charles Bradford Sheppard, II, 170 Woodland Rd., Huntingdon Valley, Pa. 19006

[21] Appl. No.: 292,786

[22] Filed: Aug. 18, 1994

[51] Int. Cl.[6] .............................. G09B 7/00; G09B 5/00
[52] U.S. Cl. ......................... 434/322; 434/309; 434/323; 434/335; 434/362; 434/365; 434/169
[58] Field of Search ..................................... 434/118, 169, 434/322, 323, 327, 350, 362, 365, 335, 309; 273/429–431

[56] References Cited

U.S. PATENT DOCUMENTS

| | | |
|---|---|---|
| 3,566,482 | 3/1971 | Morchand . |
| 4,519,606 | 5/1985 | Lussiez ................................... 273/429 |
| 4,579,533 | 4/1986 | Anderson et al. . |
| 4,712,180 | 12/1987 | Fujiyama et al. . |
| 4,891,775 | 1/1990 | McWherter . |
| 4,912,671 | 3/1990 | Ishida . |
| 4,968,257 | 11/1990 | Yalen . |
| 5,035,625 | 7/1991 | Munson et al. . |
| 5,180,309 | 1/1993 | Egnor . |
| 5,203,705 | 4/1993 | Hardy . |
| 5,219,291 | 6/1993 | Fong et al. . |
| 5,241,671 | 8/1993 | Reed et al. . |
| 5,256,067 | 10/1993 | Gildea et al. . |
| 5,257,185 | 10/1993 | Farley et al. . |
| 5,261,823 | 11/1993 | Kurokawa . |
| 5,267,865 | 12/1993 | Lee et al. . |
| 5,302,132 | 4/1994 | Corder . |
| 5,308,244 | 5/1994 | Hirose . |
| 5,316,485 | 5/1994 | Hirose ................................... 434/322 |
| 5,421,731 | 6/1995 | Walker ................................... 434/118 |

FOREIGN PATENT DOCUMENTS 6-250582 (A) 9/1994 Japan ................................... 434/323

OTHER PUBLICATIONS

"IBM" Education Local Area Network and Tools (EdLAN), sales brochure, Jan. 1991.

Matson, Dan M., "The Oriya Language Textbook Series, Volume Eight: Oriya Word Count", Cornell University, Ithaca, NY, Jul. 1970.

Carroll, John B., "Behind the Scenes in the Making of a Corpus–Based Dictionary and a Word Frequency Book", paper presented at the convention of the National Council of Teachers of English, Las Vegas, Nevada, Educational Testing Service, Nov. 1971.

Manelis, Leon, "The American Heritage Word Frequency Book and Its Relation to the Communication Lexicon", Southwest Regional Laboratory Technical Note No. 2–72–38, Los Alamitos, CA, Sep. 1972.

Hopkins, Carl J. and Moe, Alden J., The Computer–Assisted Identification of Common Word Strings From the Text of Children's Books, paper presented at the 23rd Annual Convention of the International Reading Association, Houston TX, May 1978.

MicroSIFT, "Evaluator's Guide for Microcomputer–Based Instructional Packages", International Council for Computers in Educaation, Eugene, Oregon, 1983.

(List continued on next page.)

Primary Examiner—Richard J. Apley
Assistant Examiner—Victor K. Hwang
Attorney, Agent, or Firm—Miller & Christenbury

[57] ABSTRACT

This invention provides an interactive educational apparatus and method. The apparatus includes a memory which has a reference database having plural topics, an objective rating for each topic relative to the other topics, and at least one question for selected topics. The memory also includes an educational module configured for interface between the user and the reference database. The apparatus also has a processor for executing the module, a display for displaying the questions for selected topics, and an input device for communicating to the processor user responses to questions. This invention also provides an interactive educational method for creating and using the apparatus.

49 Claims, 22 Drawing Sheets

OTHER PUBLICATIONS

Damerau, Fred J., "Evaluating Computer–Generated Domain–Oriented Vocabularies", Information Processing & Management, vol. 26, No. 6, pp. 791–801, 1990.

Breland, Hunter M. et al., "The College Board Vocabulary Study", College Board Report No. 94–4, College Entrance Examination Board, New York, NY, 1994.

Knowledge Adventure, Inc., Isaac Asimov Science Adventure II User Guide, 1994.

Knowledge Adventure, Inc., Isaac Asimov Science Adventure II Quick Reference Guide.

Harold D. Nathan, Ph.D., Cliffs Notes, Inc., Cliffs Notes Review™–Chemistry, 1993.

Cliffs Notes, Inc., Cliffs Studyware® Course Review User's Manual, 1993.

Smartek Software, Facts About Wordsmart®.

Smartek Software, Wordsmart® User Guide CD–ROM Version, Dec. 1993.

Cliffs Notes, Inc., Cliffs Studyware® for Chemistry, 1993 (Advertisement).

Smartek Software, Wordsmart®?. . . (Advertisement).

Centron Software, Crossword Creator (Windows) (Advertisement).

Wordsmart, Practical Home Schooling, Fall 1993, pp. 50–51.

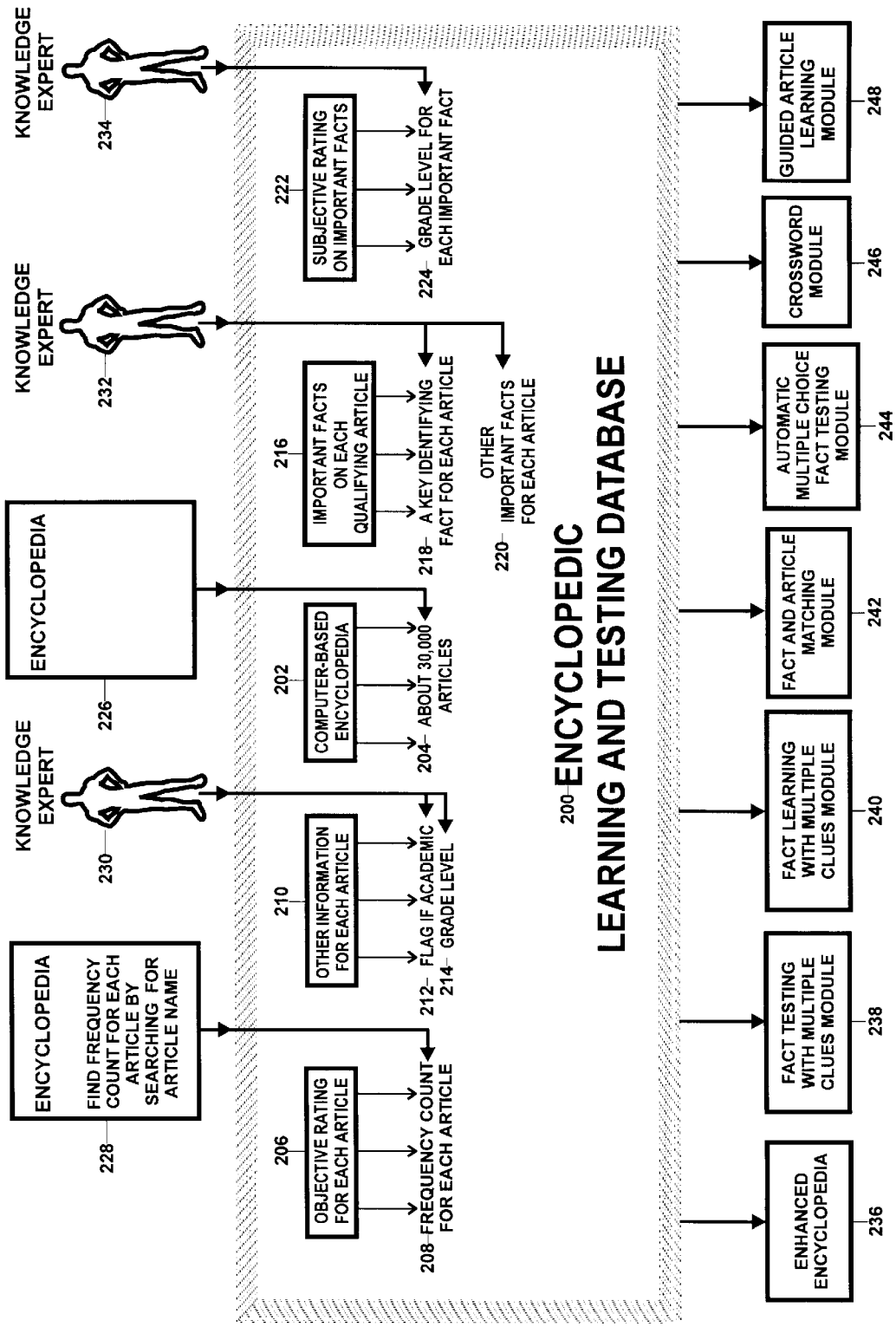

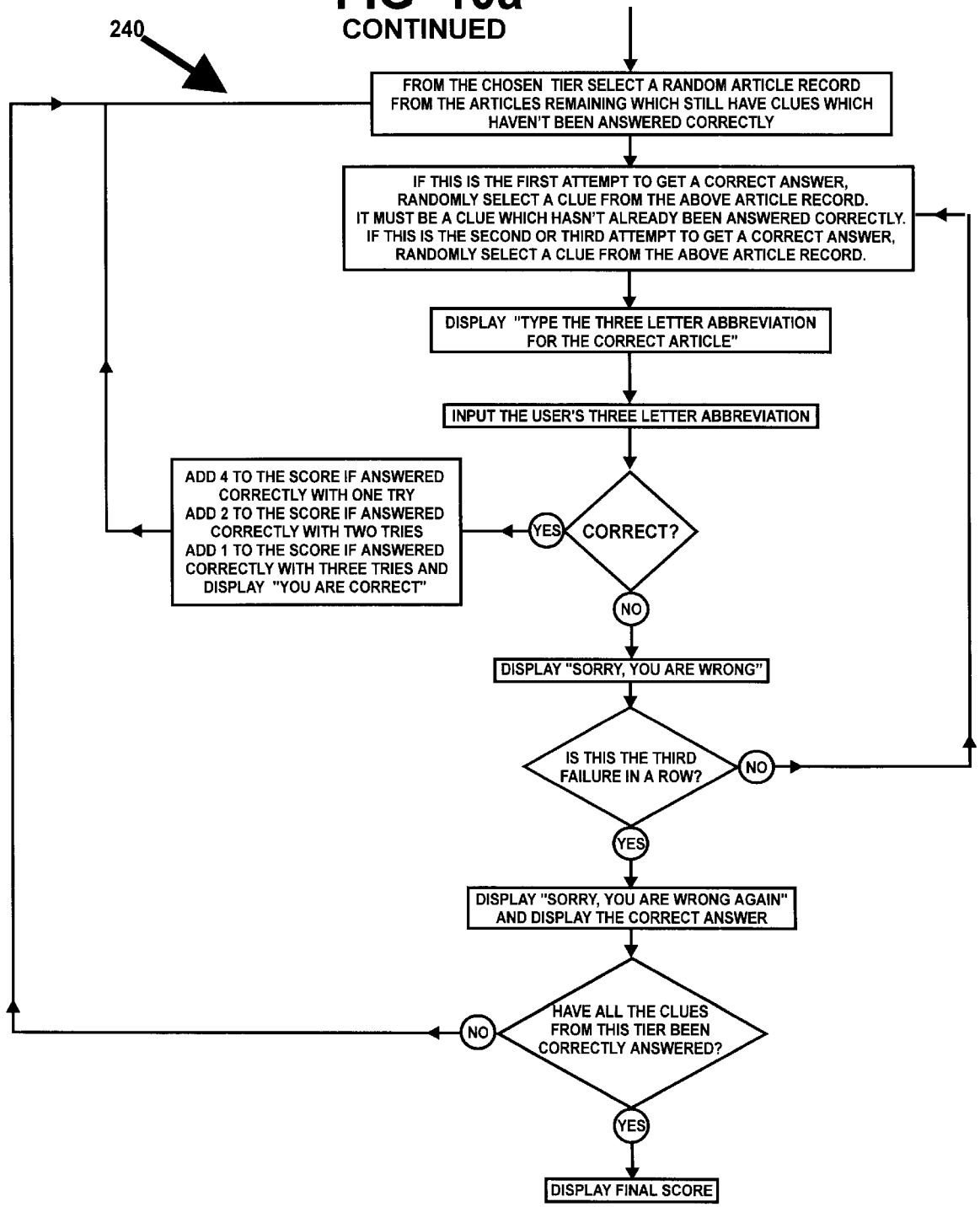

INTERACTIVE EDUCATIONAL APPARATUS AND METHOD

BACKGROUND OF THE INVENTION

This invention relates to an interactive educational apparatus providing an enhanced computer-based reference as well as learning and testing modules. It also relates to a method for creating the enhanced reference and for using the enhanced reference for interactive teaching and testing.

FIELD OF THE INVENTION

There is a constant demand for improved teaching tools and methods as educators seek more effective and efficient teaching systems. The recent increase in information access has created opportunities for teachers and students.

Computer-based reference materials are being introduced to provide access to vast quantities of information. Ordinary text encyclopedias have been converted into exciting multi-media resources. Conventional dictionaries now include sounds, pictures and even simulations. Textbooks, too, are being converted into multi-media, computerized references.

The advent of compact disks (CDs) and CD-ROM drives, capable of storing and retrieving up to or even exceeding 600 megabytes (or 300,000 pages) of data, has made numerous references available for economical use on personal computers. CDs are now available with reference works such as dictionaries, dictionaries combined with thesauri, encyclopedias, textbooks and a wide variety of other reference collections. These new, computerized reference works allow unprecedented access to information. More data than ever is available to the user, not only in text, but also in audio and video.

These computer-based references present a valuable resource for students and teachers. It is far more interesting, for example, to learn how the heart works by seeing and hearing a computer simulation than it is from dry text.

Computerized reference works are so new that their full potential have yet to be realized. The first tentative attempts to access the vast data resources of computerized reference works for learning and testing purposes have already been made. Recently, computer-based references have been introduced with learning games. The Microsoft ENCARTA CD-ROM Encyclopedia system generates a multiple-choice question for each encyclopedia article. Each question is simply the first line of article text. The correct response is the article title and the incorrect responses are randomly selected article titles.

The ENCARTA system, however, is not a comprehensive teaching and testing system. The ENCARTA system only generates a single question for each Encyclopedia article. Also, the correct answers to the automatically generated questions are relatively easy to select with limited knowledge of the Encyclopedia topic.

The FRANKLIN Electronic Dictionary, another computer-based reference, includes a number of word-play games. The FRANKLIN system includes a "hangman" game in which the user must guess the letters of a mystery word within a specified number of attempts. The FRANKLIN system also includes a "flash card" game wherein a vocabulary word from a list is displayed on a screen to challenge user knowledge of the word.

The FRANKLIN system, like the ENCARTA system, is not a comprehensive teaching and testing system. The FRANKLIN "hangman" game has educational benefit limited to spelling or perhaps logic. The FRANKLIN "flash card" game is equivalent to selecting a random word from a printed dictionary and guessing the definition before looking at the word definition.

Several programs have been introduced for use independent of a computer-based reference. The Smart Tek WORDSMART program is a vocabulary learning program that operates independently from a computer-based dictionary. The WORDSMART system covers about 200 root words on each CD. Many WORDSMART System CDs would be required to approach the scope of a dictionary.

A series of programs were introduced by Carmen Sandiego, Inc. for teaching specific subjects independent from a computer-based encyclopedia. Each CARMEN SANDIEGO program covers a single topic, such as U.S. geography. Many CARMEN SANDIEGO programs would be required to approach the scope of an encyclopedia. In fact, many learning programs are less inclusive than a computer-based encyclopedia, even within their specific topic. A comprehensive set of learning programs, if available, would be prohibitively expensive. Also, existing learning programs do not include a set of questions relating to each topic. Nor do they provide a variety of learning styles from which an effective style can be selected by each user.

Cliffs STUDYWARE for Chemistry program, available from Cliffs Notes, Inc., provides questions to supplement a chemistry course. The STUDYWARE program is divided into 24 chapters, and 18–28 multiple-choice questions are provided for each chapter. The user researches answers to the questions in a separate, printed booklet. The STUDYWARE program has a limited number of questions for each topic and there is no objective rating for the various topics addressed in the program.

The KNOWLEDGE ADVENTURE II System available from Knowledge Adventure, is a program containing 1,000 science-related articles. KNOWLEDGE ADVENTURE II System includes a Science Quiz Game relating to the articles. The program includes fewer than 200 multiple-choice questions. The user refers to a separate reference to study a topic or the correct answer to a missed question.

Accordingly, traditional computer-based references with learning games do not utilize the vast potential of the reference data. Also, traditional learning programs have a limited scope. Accordingly, previous attempts have failed to convert newly available computerized reference sources into a highly effective educational system.

Among other features, conventional systems do not provide the relative importance of each topic for the system user. For example, a student should devote more time to learning about gold than xenon.

OBJECTS OF THE INVENTION

It is an object of this invention to provide an interactive learning and testing system and method that overcomes the problems associated with prior art systems.

It is another object of the invention to provide an enhanced computer-based reference for use as a learning and testing tool.

Another object of the invention is to provide an interactive learning and testing system in which each topic is provided with an objective rating of relative importance or difficulty.

It is yet another object of this invention to provide a system for efficiently and accurately testing user knowledge.

It is another object of the invention to provide a system capable of generating unique tests for testing users and monitoring learning progress.

Other important objects will become apparent to one of ordinary skill in the art in view of the descriptions that follow.

SUMMARY OF THE INVENTION

This invention provides an interactive learning and testing system having an enhanced computer-based reference including multiple topics. Each topic is provided with an objective rating corresponding to the relative difficulty or importance of the topic. The enhanced computer-based reference also includes a series of questions relating to each topic. The interactive learning and testing system also has testing modules and learning modules for effective and efficient teaching and testing of system users.

This invention also provides a method for interactive teaching and testing. The invention provides a method for creating an enhanced computer-based reference. The invention also provides methods for learning and testing using the enhanced reference.

BRIEF DESCRIPTION OF THE DRAWINGS

FIG. 8 is a block diagram illustrating software components of an encyclopedia-based learning and testing system embodiment according to this invention.

DETAILED DESCRIPTION OF THE INVENTION

Figure 1:
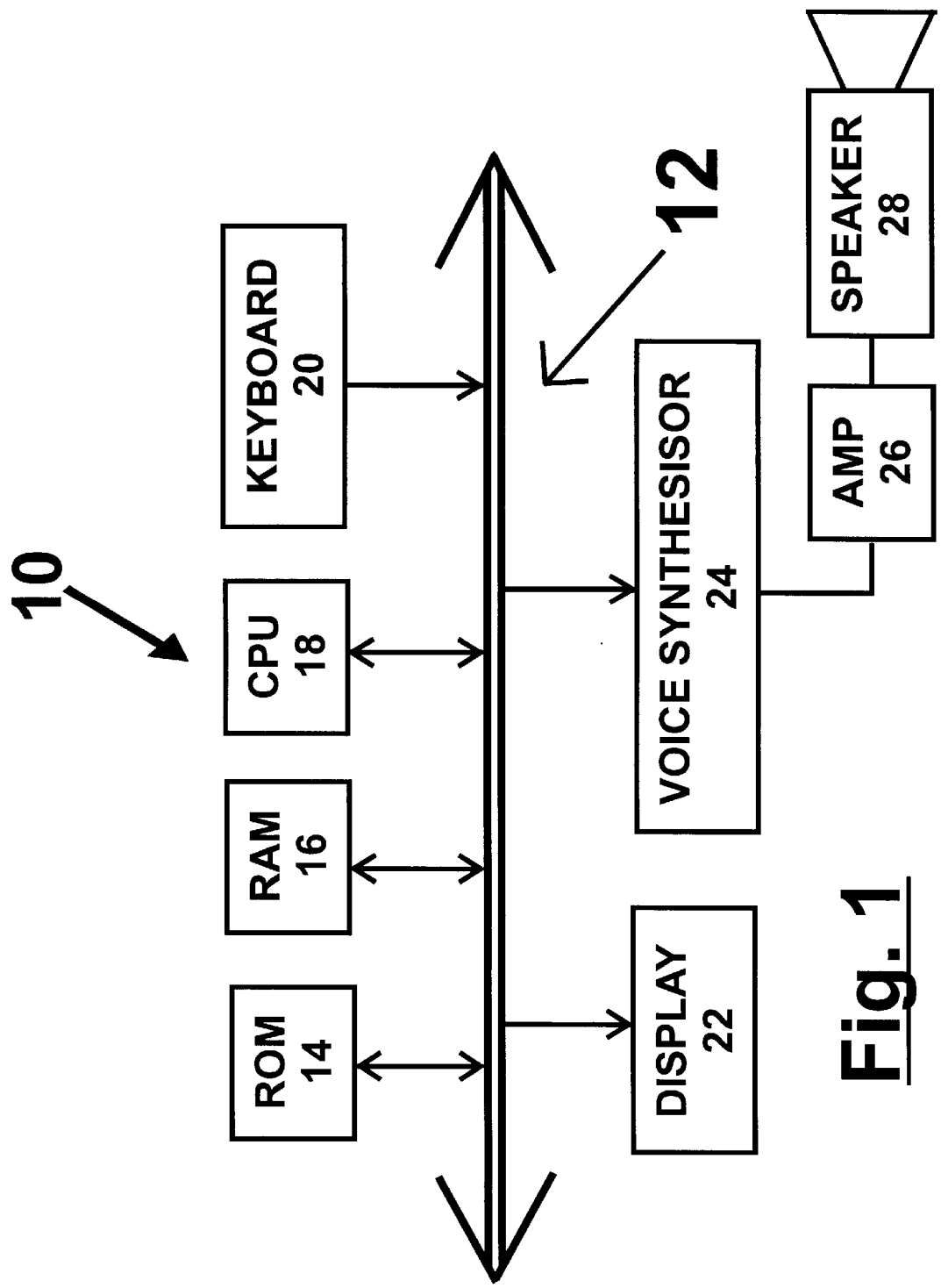
FIG. 1 is a block diagram illustrating hardware components of one embodiment of an interactive learning and testing system according to this invention.

The following description is intended to refer to the specific embodiments of the invention illustrated in the drawings. This description is not intended to define or limit the scope of the invention, which is defined separately in the claims that follow.

Referring to FIG. 1, the numeral "10" designates generally hardware components of an interactive learning and testing system according to this invention. System 10 includes a bus 12 connected in a known manner to provide data transfer paths between various hardware components. A read only memory ("ROM") 14 contains pedagogical software as well as an enhanced computer-based reference that form the heart of system 10, as will be described in detail below. ROM 14 is preferably a CD-ROM drive, a high-capacity hard drive or any other memory device capable of storing a large database of information. ROM 14 is interconnected to bus 12 to provide access to data stored in ROM 14.

A random access memory ("RAM") 16 provides storage for all data necessary for program execution. RAM 16 is connected to ROM 14 and the remaining components of system 10 via bus 12. RAM 16 receives the software and data from ROM 14. RAM 16 preferably includes at least 4 megabytes of memory or any measure of memory capable of receiving significant quantities of data and software from ROM 14.

A central processing unit ("CPU") 18 is connected to bus 12 for processing software stored in ROM 14 and RAM 16 during operation and display of the software. CPU 18 is preferably at least as powerful as a computer with an INTEL 486 chip.

System 10 is also provided with a keyboard 20 or any other known input device connected to bus 12 for input from a system user. System user is optionally a student, a teacher, a test administrator or any other individual. Also connected to bus 12 is a display 22, such as a cathode ray tube ("CRT") or any other known display, for displaying user commands, reference data, queries, and any other messages directed to or from the system user. Optionally connected to bus 12 is a voice synthesizer 24 connected through an amplifier 26 to a speaker 28. Voice synthesizer 24 is preferably a sound card at least as good as the SOUNDBLASTER synthesizer available from Creative Labs, Inc. System 10 optionally includes a mouse (not shown) connected to CPU 18 for operation of system 10 in place of or in conjunction with keyboard 20.

Figure 2:
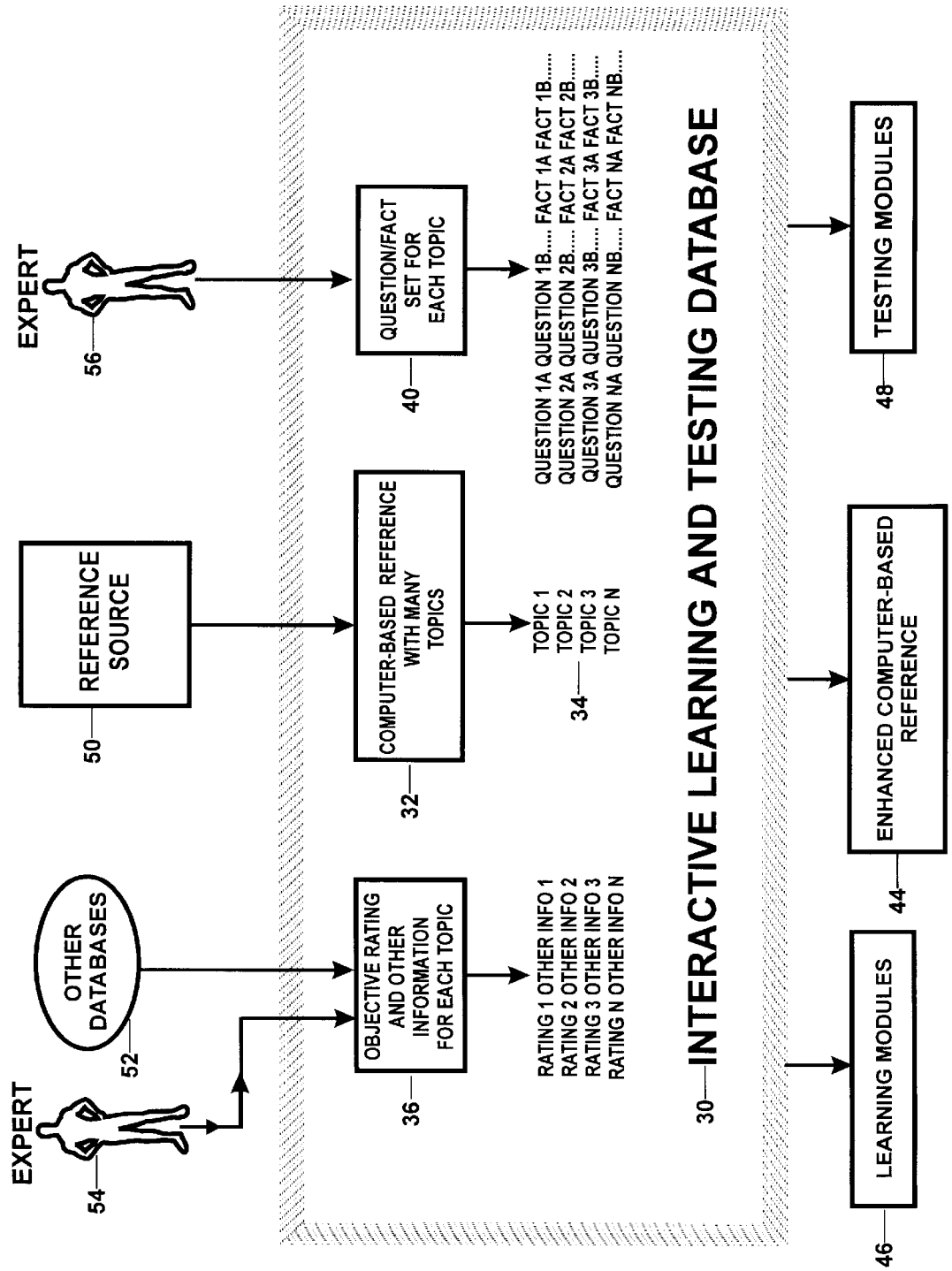
FIG. 2 is a block diagram illustrating software components of one embodiment of an interactive learning and testing system according to this invention.

Referring to FIG. 2, the software contents of one embodiment of an interactive learning and testing database 30 are shown. Database 30 is stored in ROM 14 and RAM 16 of system 10. Database 30 provides the basis for an enhanced computer-based reference 44, learning modules 46 and testing modules 48.

The core of database 30 is a computer-based reference 32 having many topics 34 (topic 1 through topic N). Topics 34 are natural sub-divisions of information contained in computer-based reference 32.

Computer-based reference 32 is created from a reference source 50. Reference source 50 is any factual or fictional information source, including encyclopedias, dictionaries, thesauri, textbooks or any other factual source capable of division into topics 34.

Computer-based reference 32 is created from reference book 50 in any way known in the art. Computer-based reference 32 is optionally an existing computer-based reference. The ENCARTA Encyclopedia, the GROLIER Electronic Encyclopedia and the FRANKLIN Electronic Dictionary are examples of a suitable computer-based reference 32.

Topics 34 are optionally narrow or broad, depending upon the nature of computer-based reference 32. If computer-based reference 32 is created from reference source 50 in the form of a dictionary or a combined dictionary and thesaurus, each topic 34 is preferably a root word defined in the dictionary. If computer-based reference 32 is based on reference book 50 in the form of an encyclopedia, then each topic 34 is preferably one article provided in the encyclopedia. Similarly, if computer-based reference 32 is based upon a reference book 50 in the form of a textbook, then each topic 34 is preferably a paragraph or group of paragraphs from a chapter marked-off by bold print. Although topics 34 are preferably words, articles, chapters or sub-chapters, they are optionally any logical sub-division of the information and data in computer-based reference 32.

Each topic 34 is provided with an objective rating and other information 36. Objective rating 36 is preferably one that does not depend on an opinion and preferably relates to the relative importance or difficulty of each topic 34 with respect to other topics 34. There are various objective ratings 36 that can be assigned to each topic 34.

One such objective rating 36 is based upon the frequency with which each topic 34 appears in a suitable sample of material. Frequency provides a measure of relative importance and difficulty for each topic 34. The more frequently a topic appears in a sample of material, the more important that topic is for understanding the sample of material. Also, the less frequently a topic appears, the more difficult that topic may be because it is esoteric or uncommon.

For example, if English dictionary words are topics 34, the frequency with which each word occurs in a suitable English language sample is optionally used for objective rating 36. A suitable English language sample is easily scanned to determine the frequency count for each word so that relative frequency and objective rating 36 can be assigned each word.

Finding a frequency count for other types of topics 34 such as encyclopedia articles is optionally based on the frequency with which an article title appears within a suitable database. The suitable database is preferably the encyclopedia itself. For example, if the topic is the chemical element sulfur, the encyclopedia is optionally scanned to determine how many times sulfur is mentioned throughout the encyclopedia.

Another perhaps simpler objective rating 36 is the count of words associated with each topic 34. For example, in a textbook, the number of words devoted to each topic 34 (a titled chapter or subsection) is a good indication of the relative importance of each topic.

Yet another objective rating 36 is the percentage of a suitable sample of people that know each topic 34. For example, if topics 34 are vocabulary words, a determination of what percentage of adults know a given word provides a measure of relative importance and difficulty.

Objective ratings are in many ways superior to subjective ratings because they do not depend on opinion and are therefore less subject to argument or debate. For example, educators could debate as to whether California is more or less important than Michigan. However, it is indisputable that California is mentioned 1,438 times in the GROLIER Electronic Encyclopedia and Michigan is only mentioned 439 times. Accordingly, knowledge of California can be said to be more important than knowledge of Michigan.

Objective ratings are also superior to rankings, which merely provide relative information. Objective ratings convey much more information. For example, objective ratings convey a ratio of importance in addition to a ranking. Continuing the California and Michigan example, the ratio of importance of California to Michigan can be said to be 1,438:439, or 3.27:1. Accordingly, the objective ratings not only convey that California can be considered more important than Michigan, but also convey that 3.27 times as much effort should be allocated to learning about California than to Michigan. Rankings alone cannot convey this information.

The other information provided with objective rating 36 for each topic 34 optionally includes classifications such as the grade level of topics 34, whether topics 34 are required school material, or any other classification such as whether the topic is a dictionary word often found on the Scholastic Aptitude Test (SAT).

Objective rating with other information 36 is produced and compiled from other databases 52 by an expert 54. Other databases 52 are optionally books, periodicals, surveys, or any other source of information. Expert 54 is optionally a teacher familiar with various classifications of information as well as the requirements of public school systems. For example, expert 54 optionally studies previously administered SAT examinations to determine which dictionary words have been tested. Based on this information, expert 54 notes the SAT words in database 30 so that they can be retrieved.

Database 30 also includes a question/fact set 40 for each topic. Question/fact set 40 is optionally at least one multiple-choice question, important facts about each topic 34 or a combination of question types. Question/fact set 40 optionally includes a "complete" set of questions for each topic 34. By "complete," it is meant that if a system user can answer the entire question set correctly, that user has mastered topic 34. A complete question/fact set 40 optionally includes multiple-choice, fill-in-the-blank and true-and-false questions.

A question/fact set 40 is prepared for each topic 34 by an expert 56. Question/fact set 40 optionally includes one or more questions and/or one or more facts. Expert 56 preferably creates challenging questions such as multiple-choice questions having several incorrect but close selections and one correct selection. Expert 56 also optionally creates question/fact sets 40 for encyclopedia-type topics 34 by identifying the most important facts from each encyclopedia article.

Accordingly, database 30 is produced from reference source 50 and other databases 52 by experts 54 and 56.

Reference source 50 is used to generate computer-based reference 32 with distinct topics 34. Expert 54 assigns objective rating and other information 36 to each topic 34. Expert 56 generates challenging question/fact sets 40 for each topic 34.

The resulting database 30 preferably includes:

(1) computer-based reference 32 having plural topics 34;

(2) objective rating and other information 36 for each topic 34; and (3) question/fact set 40 with questions and/or facts relating to each topic 34.

Database 30 forms the basis for enhanced computer-based reference 44. A user of system 10 is therefore provided with access to an objective rating of the importance or difficulty of each topic to guide use of the system. A user of system 10 is also provided with questions and/or facts relating to each topic as well as other information noted for each topic by an expert.

Database 30 also includes all that is needed to accurately test user knowledge of topics 34 with question/fact sets 40. For dictionary-type topics there is optionally one or more multiple-choice selection sets for each topic 34. For encyclopedia-type topics there are optionally multiple facts about each topic available for use as clues from which the user is asked to identify the topic. The objective importance rating of each topic permits arrangement of the test questions hierarchically to accurately assess user knowledge.

Learning and testing modules 46 and 48 are also supported by database 30. A variety of learning modules permits the user to select the learning style best suited to that user. Testing modules supported by database 30 are used to accurately monitor user knowledge and development.

Figure 3:
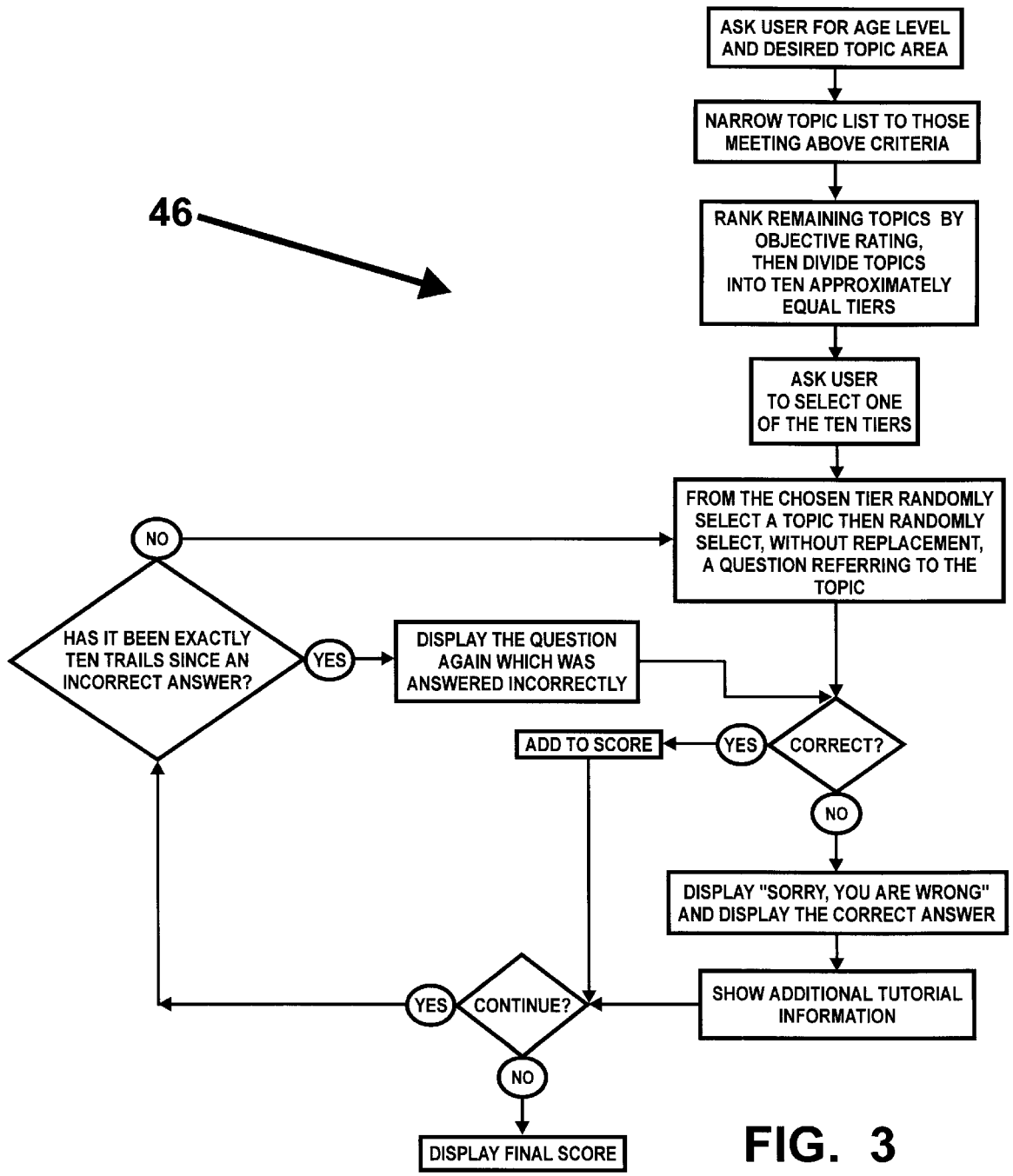
FIG. 3 is a flow diagram illustrating an interactive learning method embodiment according to this invention.

Referring to FIG. 3, a flow diagram is provided for one learning module embodiment supported by database 30. Learning module 46 begins by asking the user's age level and the topic area the user wishes to study. Any other criterion or criteria may be requested, including, for example, grade level, topic classification and any other known categorization of information. A narrowed topic list is then generated, including only those topics that meet the selected criteria. The remaining topics are then ranked according to their objective rating and divided into ten approximately equal tiers of difficulty, the first tier being the easiest. The user is then asked to select one of the ten difficulty tiers. Any other number of tiers may be used as well.

From the chosen difficulty tier, a topic is randomly selected and a question based on that topic is then randomly selected without replacement. The user is then asked the randomly selected question.

If the answer is correct, points are added to the user score and the user is asked whether or not to continue. If the user wishes to stop, a final score is displayed. If the user wishes to continue, learning module 46 re-displays a question answered incorrectly if it has been exactly ten trials since that incorrect answer. Otherwise, another topic is randomly selected from the chosen tier and a question referring to that topic is selected randomly without replacement.

If the question had been answered incorrectly, learning module 46 displays an appropriate message, such as "SORRY, YOU ARE WRONG", and displays the correct answer. Also, learning module 46 optionally displays additional tutorial information such as a word definition, an encyclopedia article, an excerpt from a textbook, or any other topical information.

Learning module 46 continues the loop until the user specifies stop. At that point the final score of the user is displayed.

Figure 4:
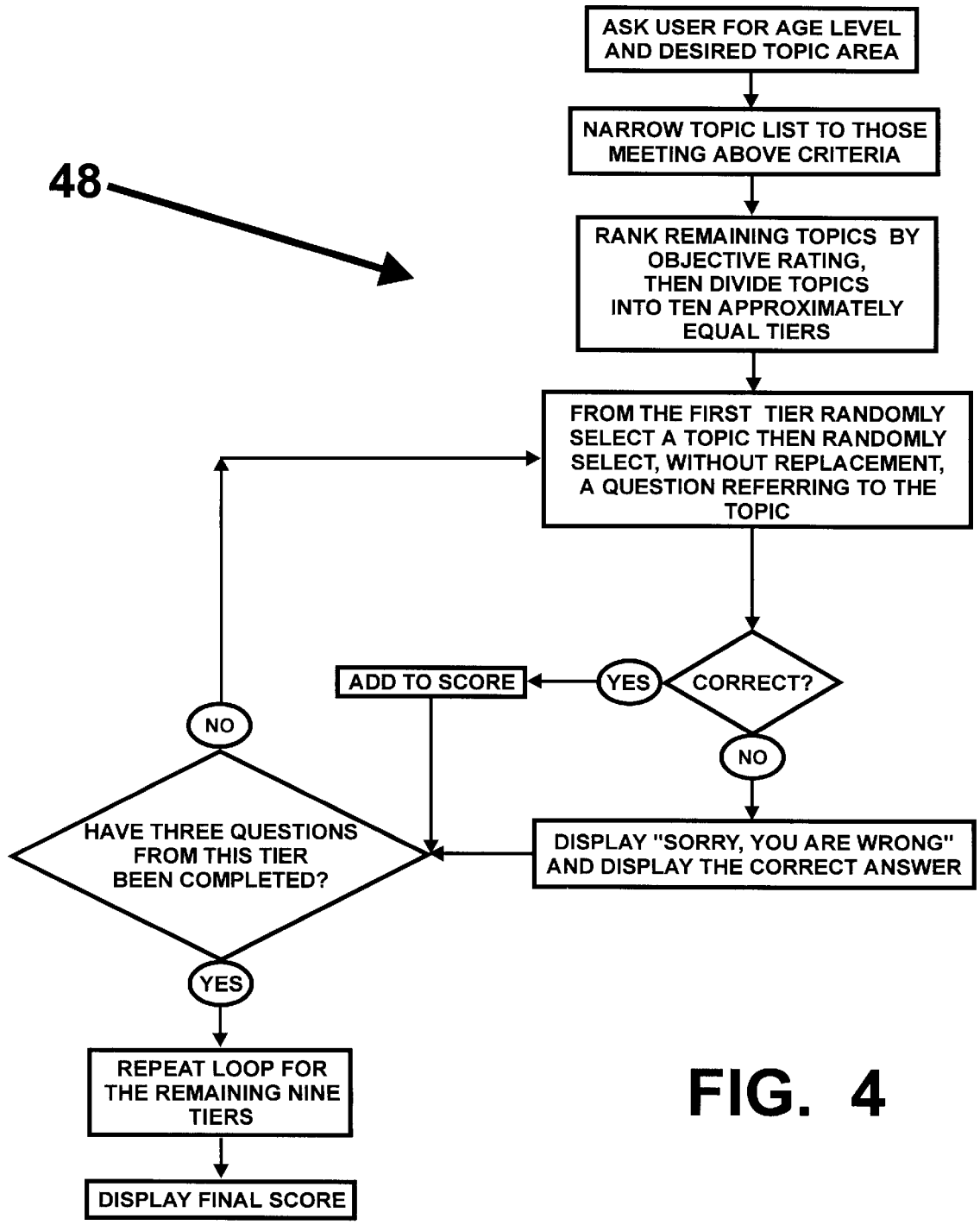
FIG. 4 is a flow diagram illustrating a testing method embodiment according to this invention.

FIG. 4 shows a flow diagram of testing module 48 supported by database 30. Testing module 48 is similar to learning module 46 except that the user is not entitled to select a difficulty tier from which the topics and questions are selected.

Instead, testing module 48 randomly selects a topic from the first (easiest) tier and then randomly selects without replacement a question based on to the randomly selected topic. If the user answers the question correctly, points are added to the user's score. If the question is answered incorrectly, a message is displayed along with the correct answer.

If three questions from the first tier have not yet been completed, another topic from the first tier is randomly selected along with a random question based on that topic, without replacement. Otherwise, the loop is repeated for the remaining nine difficulty tiers. After three questions have been completed from each of the ten tiers, the test is concluded and a final score is displayed.

Many teachers utilize standardized tests for particular topics. However, such tests are not a learning experience because the student is unaware whether a correct answer has been provided. Also, there is no opportunity for the student to immediately research the correct answer to a question answered incorrectly. Standardized tests waste valuable class time because they have no teaching benefit.

Also, standardized tests are subject to student cheating in the form of copying and preparation of multiple tests to discourage copying is expensive. Standardized tests often take a long time to grade, rendering it impractical to test students periodically to measure progress or to retest a student that had a "bad" day. Accordingly, testing module 48 overcomes these disadvantages of standardized tests.

Preferred embodiments of the interactive learning and testing system and method according to this invention will now be described with reference to FIGS. 5–12.

Figure 5:
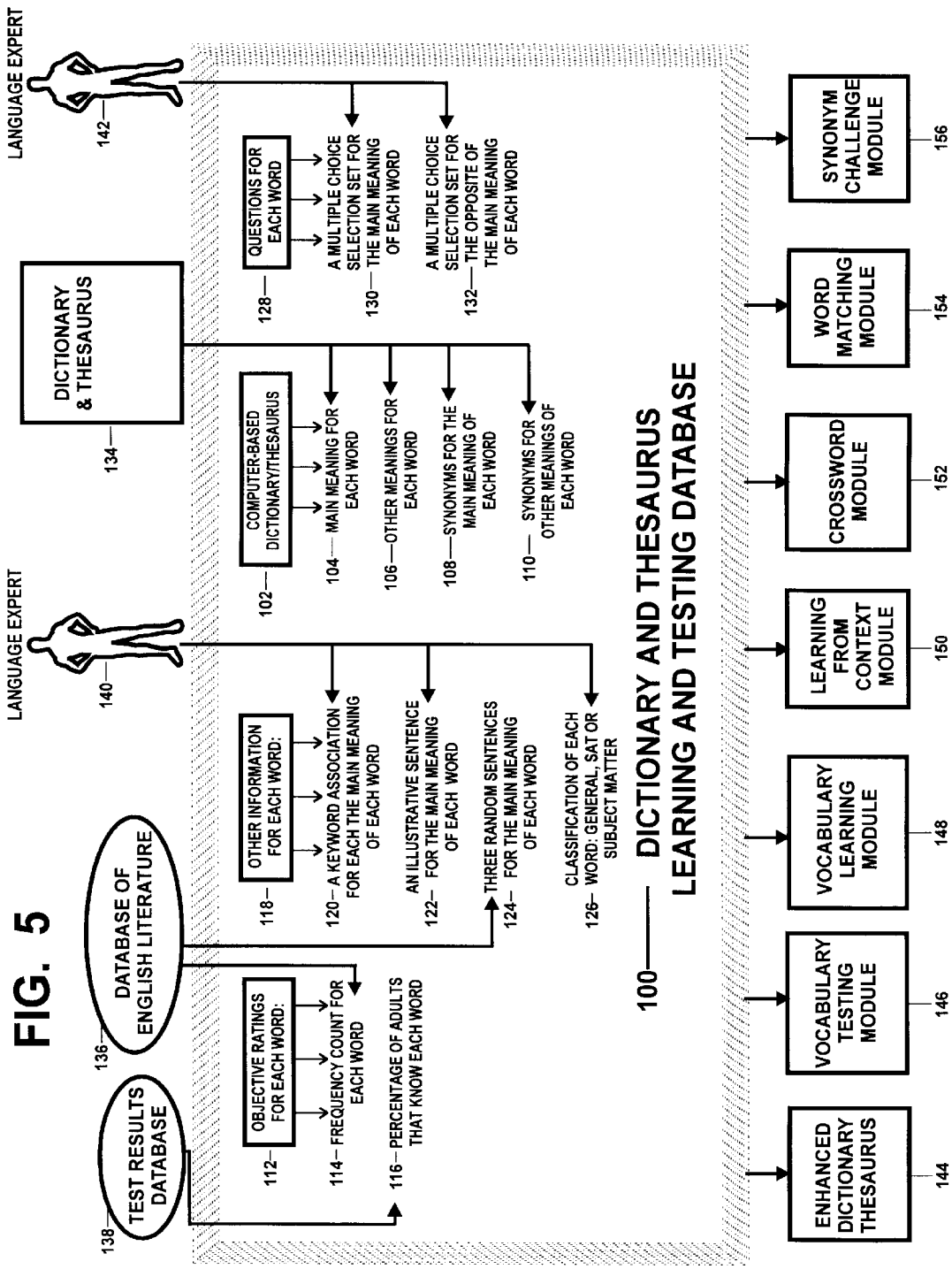
FIG. 5 is a block diagram illustrating software components of a dictionary/thesaurus-based learning and testing system embodiment according to this invention.

Referring to FIG. 5, the contents of a dictionary and thesaurus learning and testing database 100 are shown. Database 100 includes a computer-based dictionary/thesaurus 102 wherein the topics 34 described with reference to FIG. 2 are dictionary words. Computer-based dictionary/thesaurus 102 includes the main meaning for each word 104, other meanings for each word 106, synonyms for the main meaning of each word 108 and synonyms for other meanings of each word 110.

Computer-based dictionary/thesaurus 102 is created from a printed dictionary or combined dictionary and thesaurus 134. Dictionary 134 is optionally a general dictionary such as an English language dictionary or is optionally a specialized dictionary such as a legal dictionary, children's dictionary, medical dictionary, scientific dictionary or any other known specialized dictionary or combination of dictionaries. Computer-based dictionary/thesaurus 102 is optionally created with an electronically stored human voice pronouncing each dictionary word.

Electronic dictionaries are known and are readily available. They often include up to 70,000 words or more together with definitions and other helpful information such as synonyms.

Database 100 also includes one or more objective ratings 112 for each word. Objective rating 112 is optionally the frequency count 114 for each word within a specific database of English literature 136. Several lists of word frequency counts are commercially available. Frequency count 114 for each word is based on any selected database or sample of English literature, narrow or broad. Also, although database 100 is described with reference to the English language, it is contemplated that database 100 can include any foreign or scientific language dictionary.

Objective rating 112 is also optionally based on a percentage of adults that know each word 116 as derived from a test results database 138. The percentage of adults that know each word 116 is more expensive to generate than frequency count 114 because it is necessary to test a large sample of adults. However, the percentage of adults that know each word 116 is the preferred objective rating because there are some low-frequency words that many people know from the structure of the word and, conversely, there are some relatively high-frequency words known by a low percentage of adults.

Database 100 also includes other information 118 for each word, including a keyword association for the main meaning of each word 120, and illustrative sentence for the main meaning of each word 122, three random sentences for the main meaning of each word 124 and a classification for each word 126.

Many studies have shown that the use of keyword associations is a very effective vocabulary teaching method. For example, the meaning of the word "antsy", referring to the inability to remain still, is easily retained by a student that imagines "ants" on the student making the student fidget.

Also, context sentences are helpful for learning and deriving the meaning of dictionary words. Such sentences are provided in the form of illustrative sentence 122 and random sentences 124. The classification for each word 126 categorizes each dictionary word based on the word's subject matter and/or whether it fits in a specific category such as an SAT word or as a specific grade level.

Other information for each word 118 is generated using database of English literature 136 and a language expert 140. Language expert 140 provides keyword association 120, illustrative sentence 122 and classification 126. Three random sentences 124 are derived from database 136 by scanning the database randomly to pick out three sentences using the main meaning of each dictionary word. Random sentences 124 are different from illustrative sentence 122 in that random sentences 124 may not readily show the word's meaning.

Database 100 also includes questions for each word 128. Questions 128 are preferably at least one multiple-choice selection set for the main meaning of each word 130 and at least one multiple-choice selection set for the opposite of the main meaning of each word 132. Multiple-choice selection sets 130 and 132 preferably each have one correct choice and seven incorrect choices. Multiple-choice selection sets 130 and 132 are each displayed with the correct choice and four incorrect choices randomly selected from the seven incorrect choices.

Accordingly, database 100 preferably includes the following main components:

(1) computer-based dictionary/thesaurus 102 having for each word main meaning 104, other meanings 106, synonyms for the main meaning 108 and synonyms for other meanings 110;

(2) objective ratings 112 including for each word frequency count 114 and percentage of adults that know each word 116;

(3) other information 118 including for the main meaning of each word keyword association 120, illustrative sentence 122, three random sentences 124 as well as classification 126; and (4) questions 128 including for each word multiple-choice selection set for the main meaning 130 and multiple-choice selection set for the opposite of the main meaning 132.

Database 100 forms the basis for an enhanced dictionary and thesaurus 144. Enhanced dictionary and thesaurus 144 is in itself a helpful reference tool. When a word is looked up in enhanced dictionary and thesaurus 144, the user receives definitions and synonyms as well as a word frequency count indicating the word difficulty. This can be an important benefit if the user is writing for a specific grade level. Also, four sentences are provided to aid the user's comprehension of the word. This wealth of information provides an enhanced learning tool.

Database 100 supports a variety of learning and testing modules, including a vocabulary testing module 146, a vocabulary learning module 148, a learning from context module 150, a crossword module 152, a word matching module 154, and a synonym challenge module 156. This variety of learning modules permits the user to select the learning style best suited to that user. Vocabulary testing module 146 is used to accurately monitor user knowledge and development. Database 100 also optionally supports several entertaining learning games such as crossword module 152 and word matching module 154 to teach and entertain the user.

Figure 6:
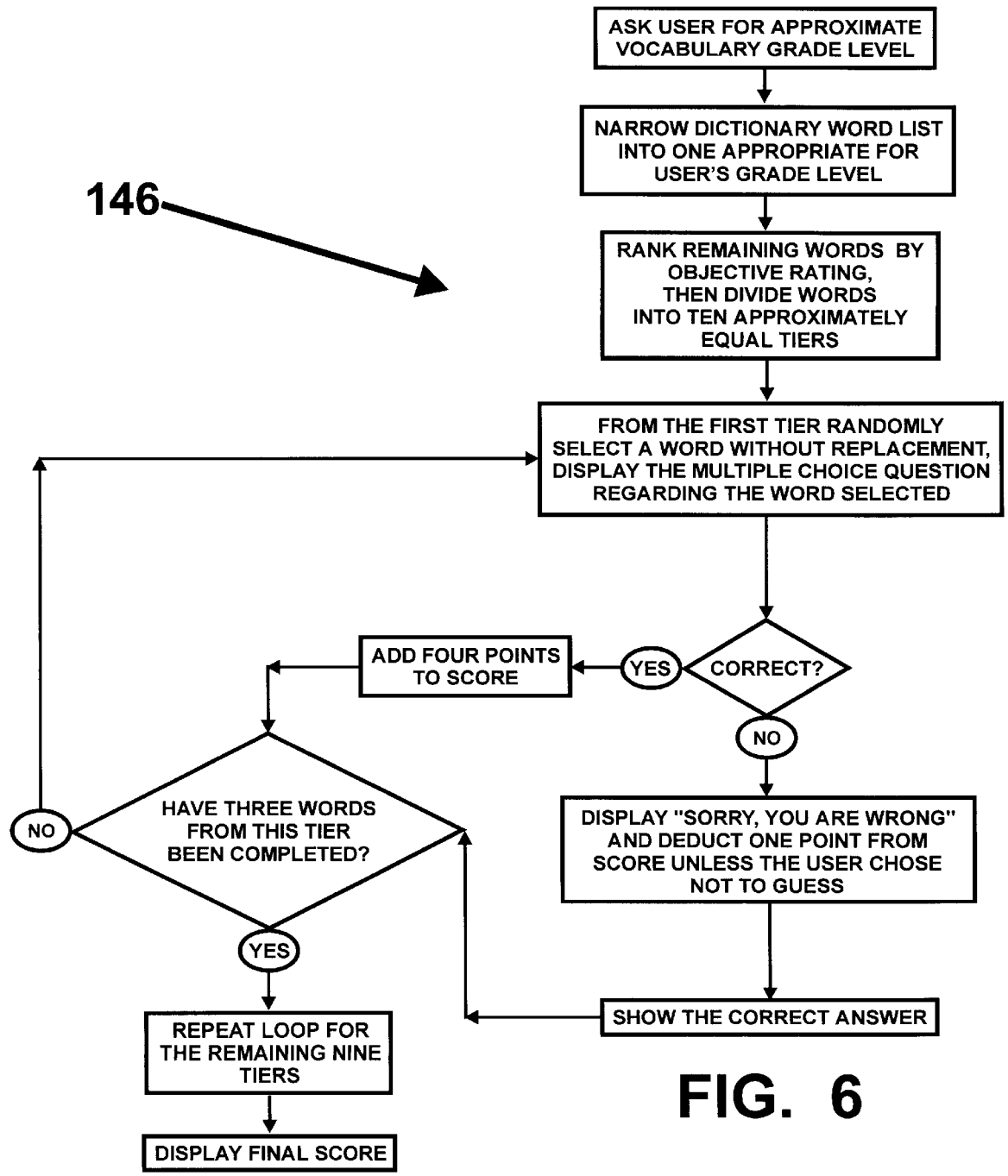
FIG. 6 is a flow diagram illustrating a testing method embodiment supported by the software components shown in FIG. 5.

Referring to FIG. 6, a flow diagram is provided to illustrate the operation of vocabulary testing module 146. First, the user is asked for an approximate vocabulary grade level and a narrow dictionary word list is generated to include appropriate words. Accordingly, a list of the approximately 70,000 root words in database 100 is narrowed to include only those words appropriate for the user's knowledge level. The word list is then ranked according to the objective rating assigned each word. The rank is based on either of the two objective ratings, namely frequency count 114 or percentage of adults that know each word 116. The list is then divided into ten approximately equal tiers of difficulty.

From the first (easiest) difficulty tier, a word is selected without replacement and a multiple-choice question for the word is displayed on the computer screen. Vocabulary testing module 146 displays the multiple-choice question with one correct answer and four incorrect answers randomly selected from the seven incorrect answers for each word in database 100.

If the user answers the multiple-choice question correctly, four points are added to the user's score. If three words from the first difficulty tier have been completed, then the loop is repeated for the remaining nine difficulty tiers, after which a final score is displayed.

If the multiple-choice question is answered incorrectly, an appropriate message is displayed and a point is deducted from the user score unless the user chose not to guess the answer to the question. The correct answer is then displayed for the user. If three words from the first difficulty tier have not been completed, then another word is selected from the first difficulty tier without replacement and an associated multiple-choice question is displayed for the user on the computer screen.

Vocabulary testing module 146 asks the user thirty (30) questions after which the user's score is totaled. After sufficient testing data is available from many test subjects, a percentile rank and grade level are optionally generated.

Vocabulary testing module 146 cannot be outgrown because it includes every word in the computer-based dictionary. Also, random selection of words from each difficulty tier produces a different vocabulary test each time it is administered. The test provided by vocabulary testing module 146 is also a learning experience because the user is told the correct answer when an incorrect response is entered. Also, the vocabulary test results are displayed instantly upon completion and the user and test administrator do not have to wait for test results.

FIGS. 7a–7e illustrate a variety of vocabulary learning modules supported by database 100. Vocabulary learning module 148 (FIG. 5) is illustrated in the flow diagram in FIG. 7a. Vocabulary learning module 148 begins in essentially the same manner as vocabulary testing module 146 except that the user is asked to select one of the ten difficulty tiers. Accordingly, the user is able to select a level of difficulty to study.

Words are randomly chosen from the selected difficulty tier without replacement and a stored multiple-choice question is given for each word. If the user answers the multiple-choice question correctly, four points are added to the user's score and the user is asked if he wants to stop. If the answer is incorrect, the question is saved and administered again ten questions later for reinforcement. Also, if the answer was incorrect, a message is displayed and one point is deducted from the user's score unless the user chose not to guess. The correct answer is displayed followed by the dictionary definition, synonyms, an illustrative sentence and a keyword association for the word.

If the user wishes to continue, and it has been exactly ten trials since an incorrect answer, the multiple-choice question regarding the previously missed word is repeated. If it has not been exactly ten trials since an incorrect answer, a new word is randomly selected from the chosen difficulty tier without replacement and the associated multiple-choice question is displayed. The loop continues until the user wishes to stop, at which time a final score is displayed so that the user knows exactly what progress has been made.

Figure 7A:
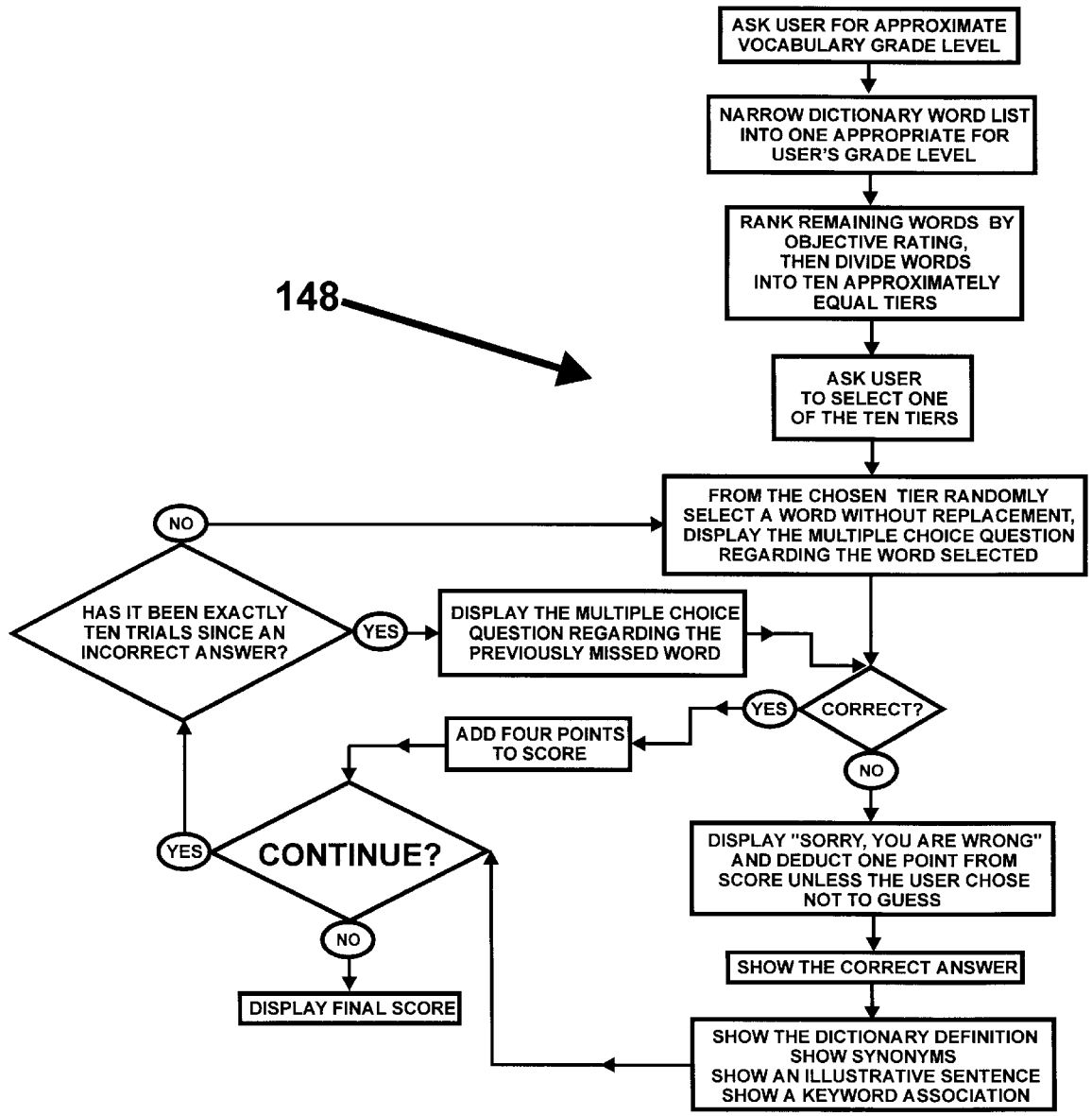
FIG. 7a is a flow diagram illustrating a learning method embodiment supported by the software components shown in FIG. 5.
Figure 7B:
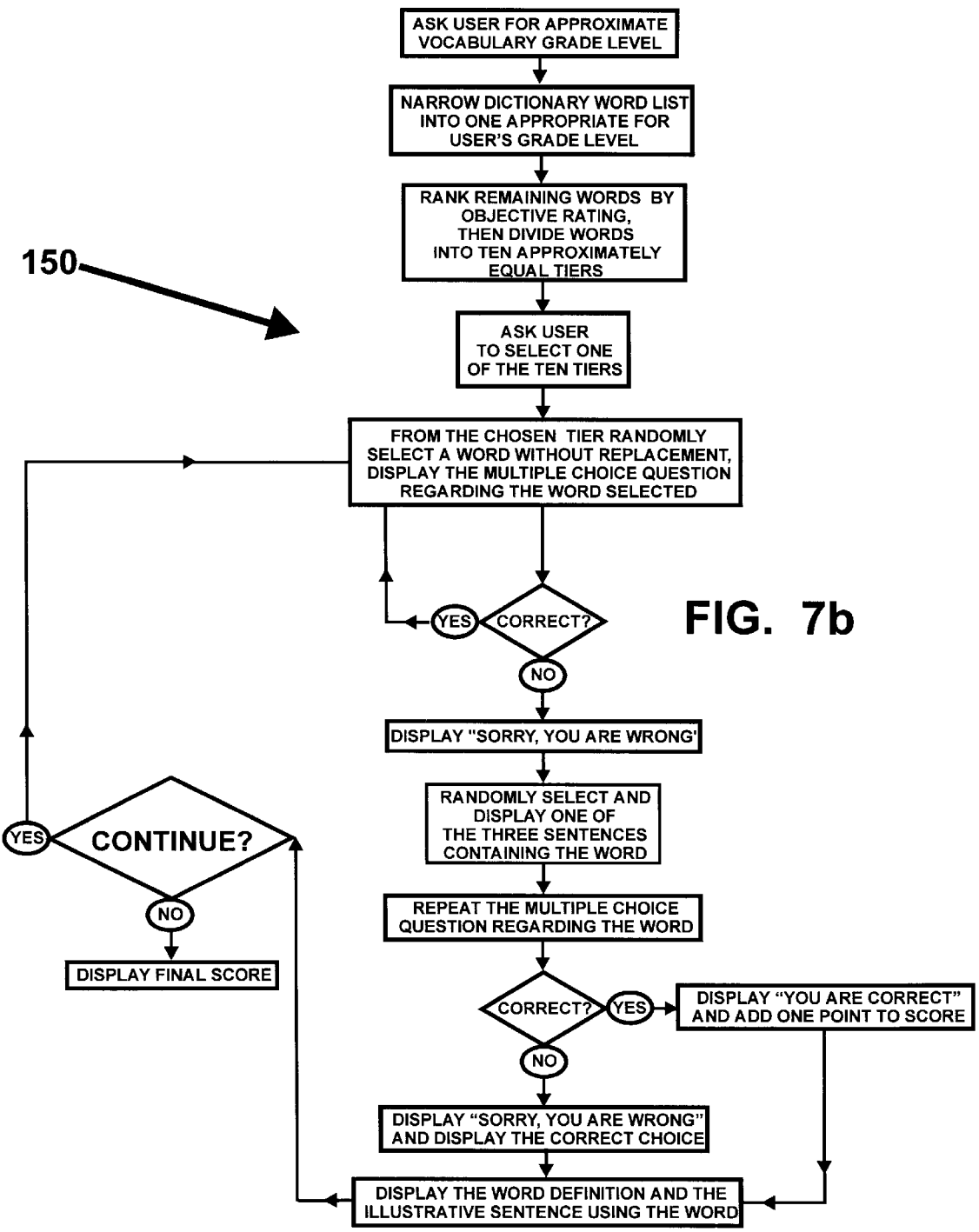
FIG. 7b is a flow diagram illustrating another learning method embodiment supported by the software components shown in FIG. 5.

FIG. 7b illustrates details of learning from context module 150 introduced in FIG. 5. Learning from context module 150 starts in the same manner as vocabulary learning module 148, including the user's selection of one of ten difficulty tiers. From the chosen difficulty tier, a word is randomly selected without replacement and the associated multiple-choice question is displayed.

If the user answers correctly, another word is randomly selected without replacement and another multiple-choice question is displayed. If the user answers incorrectly, a message is displayed and one of the three random sentences 124 in database 100 is displayed. The multiple-choice question is then repeated.

If the user answers correctly, an appropriate message is displayed and one point is added to the user's score. If the question is answered incorrectly, an appropriate message is displayed along with the correct answer. Whether answered correctly or not, the word definition 104 and illustrative sentence 122 from database 100 are displayed and the user is asked if he wishes to continue.

Learning from context module 150 operates with the understanding that most words are learned from context. Learning from context module 150 increases the user's ability to learn words from context. It also provides a final score for monitoring user development.

Figure 7C:
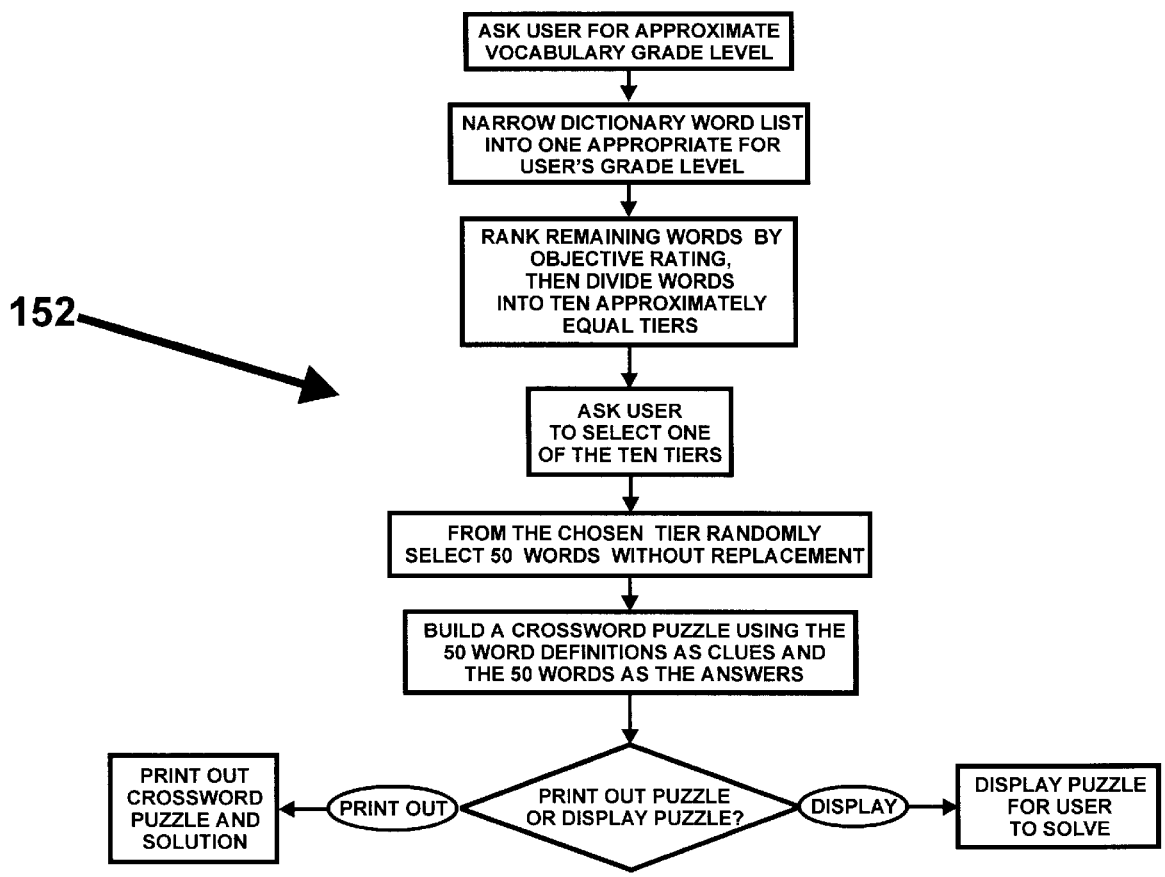
FIG. 7c is a flow diagram illustrating yet another learning method embodiment supported by the software components shown in FIG. 5.

Referring to FIG. 7c, crossword module 152, an educational game module, begins in the same manner as the other learning modules, including user selection of one of ten difficulty tiers. From the chosen difficulty tier, crossword module 152 randomly selects fifty (50) words without replacement. Crossword module 152 then "builds" a crossword puzzle using the 50 word definitions as clues and the 50 words themselves as the answers. Crossword module 152 asks the user whether to print out the puzzle or solve the puzzle on the display screen.

Systems for generating crossword puzzles are known in the art. For example, the CROSSWORD CREATOR System, offered by Centron Software, automatically generates crossword puzzles based on selected word lists.

Figure 7D:
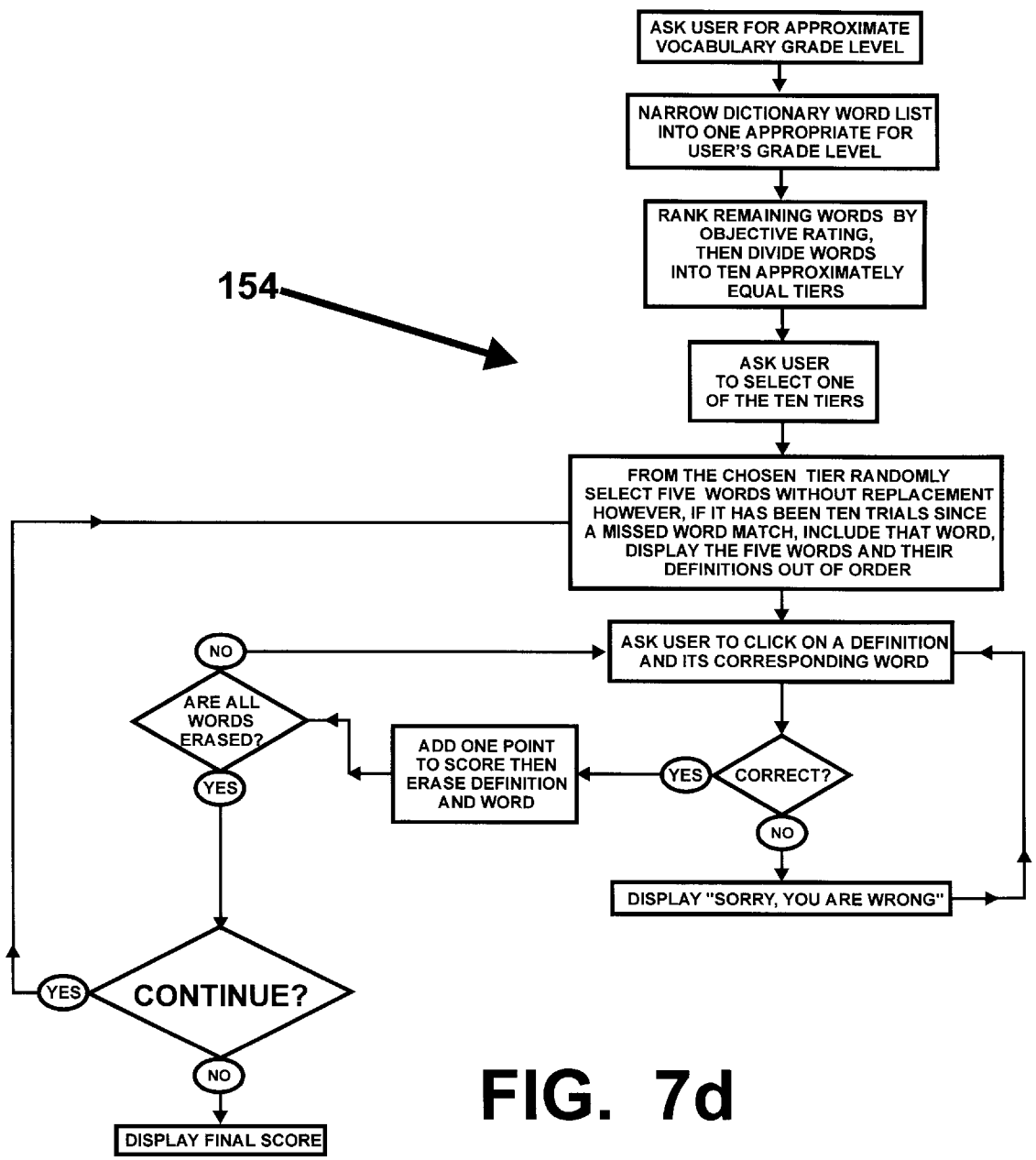
FIG. 7d is a flow diagram illustrating still another learning method embodiment supported by the software components shown in FIG. 5.

FIG. 7d illustrates details of word-matching module 154, another educational game module. Word-matching module 154 begins in the same manner as the other learning modules, including user selection of a difficulty tier. Word-matching module 154 then randomly selects five words from the chosen tier without replacement. The selected five words and their definitions are displayed out of order on the computer screen. If it has been ten trials since a missed word match, the missed word is included with the five words selected.

The user is asked to select a word and its corresponding definition. This can be done in any known manner, including use of a mouse to "click on" a word and then "click on" its corresponding definition.

If the match is incorrect, then an appropriate message is displayed and the user tries again. If the user answer is correct, then one point is added to the user score and the matched definition and word are erased. After all the words and their definitions are erased, the user is asked if he wishes to stop. If yes, a final score is displayed. If not, five more words are randomly selected from the chosen tier and displayed out of order with their definitions.

Figure 7E:
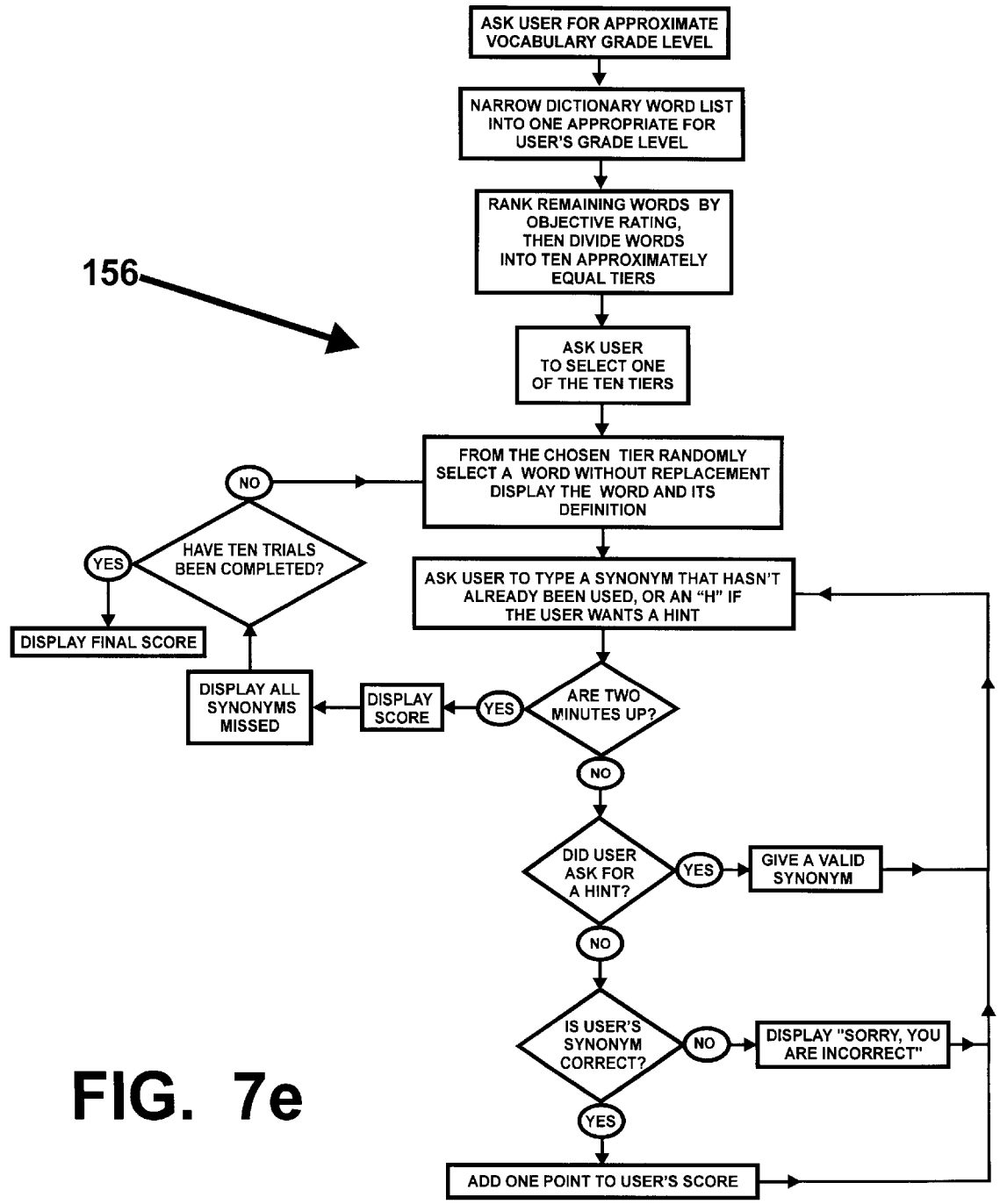
FIG. 7e is a flow diagram illustrating another learning method embodiment supported by the software components shown in FIG. 5.

Details of synonym challenge module 156 are shown in FIG. 7e. Synonym challenge module 156 begins in the same manner as the other learning modules, including user selection of a difficulty tier, except that the objective rating of difficulty is the number of synonyms that the word has in database 100. Synonym challenge module 156 randomly selects a word from the chosen difficulty tier without replacement and displays the word and its definition.

The user is then asked to type a synonym that has not already been used or an "H" if he wishes to have a hint. The user has two minutes to respond. The user is provided with a valid synonym if the user asked for a hint. If within the two minutes the user provides a correct synonym, a point is added to the user's score. Otherwise, an appropriate message is displayed and the user is again asked to type a synonym or ask for a hint.

If the two-minute period expires, the user's score is displayed along with all synonyms missed for the randomly selected word. If ten trials have been completed, then a final score is displayed. If not, another word is randomly selected and the loop is continued until ten trials are complete.

The objective of synonym challenge module 156 is to increase the number of synonyms the user can recall for a given word. This is important because the number of synonyms we have available helps determine the quality of our written and spoken language. During the two-minute period in synonym challenge module 156, the student is asked to type as many synonyms of the selected word that the user knows. The user's score for the word is the number of correct synonyms the user named correctly.

Any words that are misspelled are optionally noted and a menu of words is optionally given the user to choose from. This is a standard spell-check program presently included with almost all computer-based dictionaries.

Referring to FIG. 8, the contents of an encyclopedic learning and testing database 200 adapted for use in system 10 is shown in block-diagram form. Database 200 has as a main component a computer-based encyclopedia 202 containing about thirty thousand (30,000) articles 204. Computer-based encyclopedia 202 is generated from a printed encyclopedia 226 in a known manner or, alternatively, an existing electronic encyclopedia can be used. Examples include the GROLIER and Microsoft ENCARTA electronic encyclopedias. Printed encyclopedia 226 is optionally a general knowledge encyclopedia but may also be specialized for a specific topical area or knowledge level.

Database 200 also includes an objective rating 206 for each article in the form of a frequency count 208. Frequency count 208 is optionally determined simply by searching for the title of each article throughout an encyclopedia 228. Encyclopedia 228 is optionally the same as encyclopedia 226 or computer-based encyclopedia 202. This is easily done using known search algorithms.

Frequency count 208 is a measure of the importance and difficulty of each article.

For example, iron appears 2,001 times, zinc 340 times, and germanium 43 times in the GROLIER Encyclopedia. From this it can be determined that their relative importance is 2,001:340:43. In other words, iron is about seven times as important as zinc and about fifty times as important as germanium. Similarly, the rare occurrence of germanium in the encyclopedia renders that topic more obscure and difficult.

For article titles having more than one meaning, an expert narrows the title search to identify only those titles having the desired meaning. For example, a search for the element "lead" is optionally narrowed to include "lead" and "metal". Similarly, a search for the State of Mississippi must be narrowed by an expert to exclude, for example, the Mississippi River.

Other article titles may appear throughout encyclopedia 228 in various forms. For example, the article title "Franklin Delano Roosevelt" would be searched under "FDR" as well.

Database 200 also includes other information 210 for each article. Other information 210 includes whether each article is academic 212 and the grade level 214 of each article. The designation of an article as academic 212 and as being of a specific grade level 214 can be performed by a knowledge expert 230. Other information 210 also preferably includes a subject matter classification for each article.

Database 200 also includes important facts 216 on each qualifying article. A knowledge expert 232 reviews each article to designate a key identifying fact 218 for each article as well as a series of other important facts 220. Key identifying fact 218 is a well-known fact for each article 204. A "qualifying" article is optionally defined as any article having a frequency count of at least 30. With this criteria, about 15,000 of the 30,000 encyclopedia articles qualify. Of course, important facts 216 are optionally prepared for all articles, not just qualifying articles.

Important facts 216 preferably include all important facts relating to a specific article 204 as determined by an expert. Important facts 216 are those facts regarding a topic that a reasonably educated person should know or wish to know. A set of important facts 216 that includes all important facts regarding an article 204 is considered a "complete" set of facts. Knowledge of every fact in a "complete" set of important facts 216 would, in the opinion of an expert, constitute knowledge of the corresponding article 204.

Database 200 also includes subjective rating 222 on important facts 216. A knowledge expert 234 reviews important facts 216 to assign a subjective rating 222 such as the grade level for each important fact 224. Also, facts representing required school knowledge are optionally noted.

Resulting database 200 includes the following main components:

(1) computer-based encyclopedia 202 having articles 204;

(2) objective rating 206 having for each article a frequency count 208;

(3) other information 210 including for each article an indication whether the article is academic 212 and in which grade level 214 the article belongs;

(4) important facts 216 including for each qualifying article a key identifying fact 218 and a series of other important facts 220; and (5) subjective rating 222 including for each important fact 216 grade level 224.

Database 200 provides an enhanced encyclopedia 236 as a learning resource. When a user accesses an article from enhanced encyclopedia 236, the user gets the article itself, the frequency count as a measure of importance or difficulty, the most important facts of the article and grade level of each fact. This information provides a great learning benefit. Instead of studying an entire article dedicated to South Dakota, for example, the user can focus on four important facts selected by an expert.

Database 200 also provides the basis for a series of modules, including a fact testing with multiple clues module 238, a fact learning with multiple clues module 240, a fact and article matching module 242, an automatic multiple-choice fact testing module 244, a crossword module 246, and a guiding article learning module 248. These modules permit teaching and testing of a user on all the information contained in computer-based encyclopedia 202.

Figures 1, 9A:
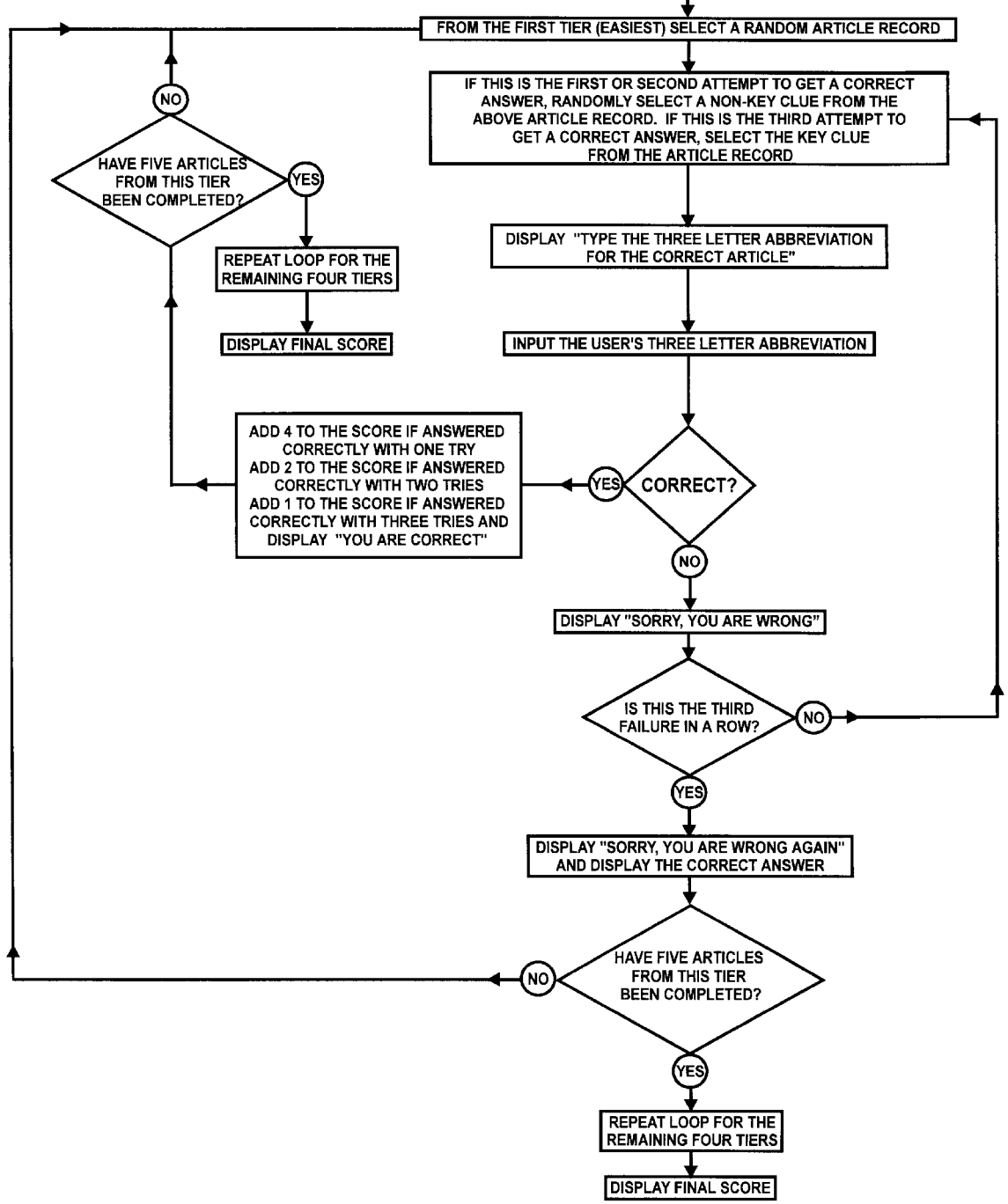
FIG. 9a is a flow diagram illustrating a testing method embodiment supported by the software components shown in FIG. 8.

Referring to FIG. 9a, details of fact testing with multiple clues module 238 are shown in flow diagram format. Module 238 first presents user with a subject list from which to choose. Module 238 also asks for the user's difficulty preference. Module 238 then scans database 200 for qualifying articles and store them in computer memory with the article title, frequency count and important facts. These stored data represent an article record. The qualifying articles are then ranked according to their frequency count and the articles are divided into five approximately equal difficulty tiers.

From the first (easiest) tier, a random article is selected and a non-key identifying fact is selected for the given article. If, however, it is the user's third attempt to get a correct answer for that article, the key identifying fact is selected. Module 238 requests the user to input the correct article title. If the user is correct, then points are added to the user score depending on how many tries it took to get the correct answer. For example, add four to the user's score if the question was answered correctly in one try. Add two points for a question answered correctly with two tries and add one if it took three tries. Another article is then randomly selected from the first tier and the loop is continued.

If the user answer is incorrect, an appropriate message is displayed along with another fact. If this is the third failure, then the correct answer is displayed. If five articles from the first tier have been completed, then the loop is repeated for the remaining four difficulty tiers, after which a final score is displayed.

Figure 9B:
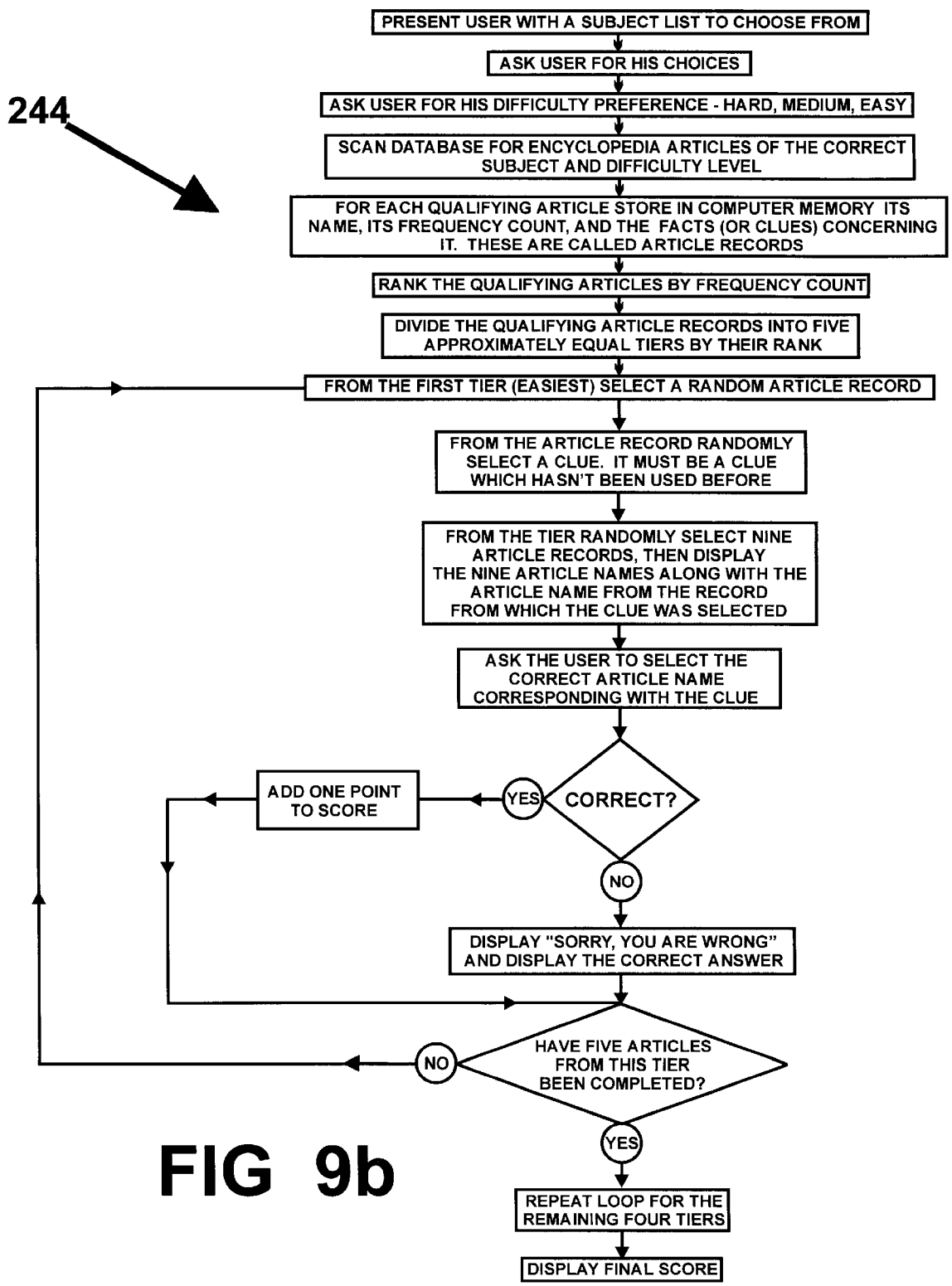
FIG. 9b is a flow diagram illustrating another testing method embodiment supported by the software components shown in FIG. 8.

FIG. 9b shows details of automatic multiple-choice testing module 244. Module 244 begins the same as module 238. From the randomly selected article from the first tier, a fact is randomly selected that has not been used before. Nine other article records are randomly selected from the tier (and from the same subject) and the article names are displayed along with the article from which the fact was selected. The user is then asked to select the correct article name corresponding to the fact.

If the answer is correct, then a point is added to the user's score. If the answer is wrong, then an appropriate message is displayed along with the correct answer. The loop is continued until five articles from the first tier have been completed, after which the loop is repeated for the remaining four tiers. After all the tiers have been completed (after 25 questions), a final score is displayed.

Figure 10A:
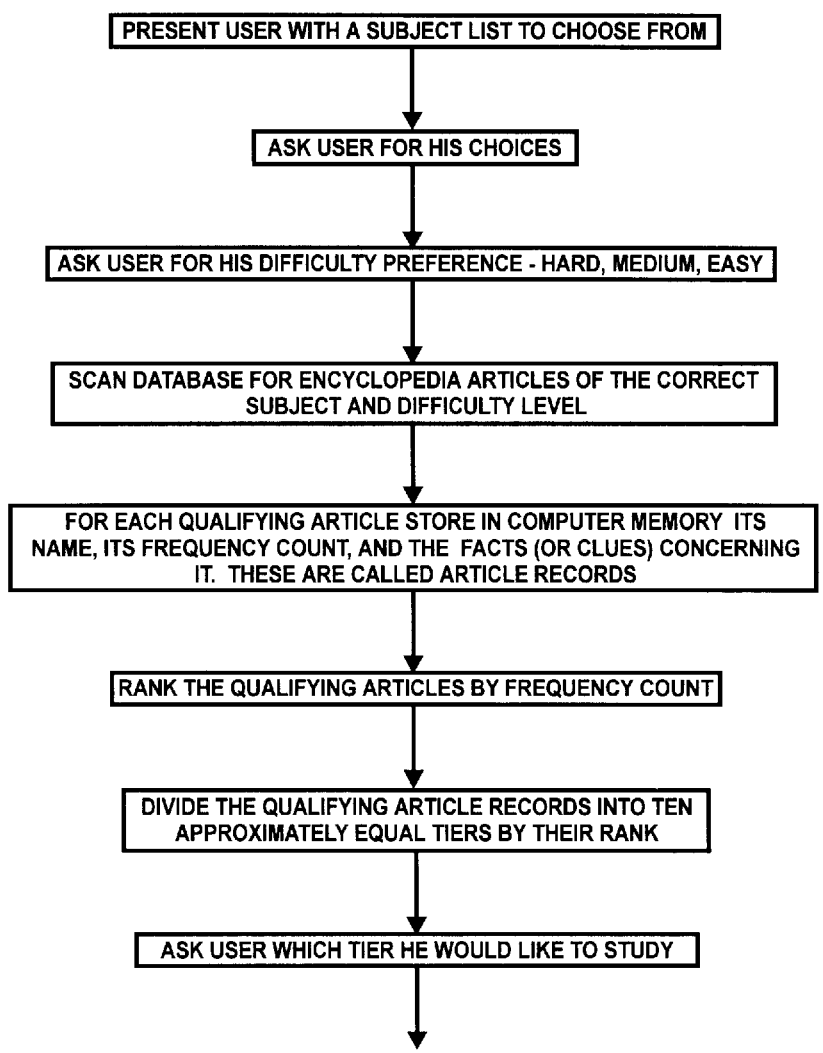
FIG. 10a is a flow diagram illustrating a learning method embodiment supported by the software components shown in FIG. 8.
Figures 1, 10A:
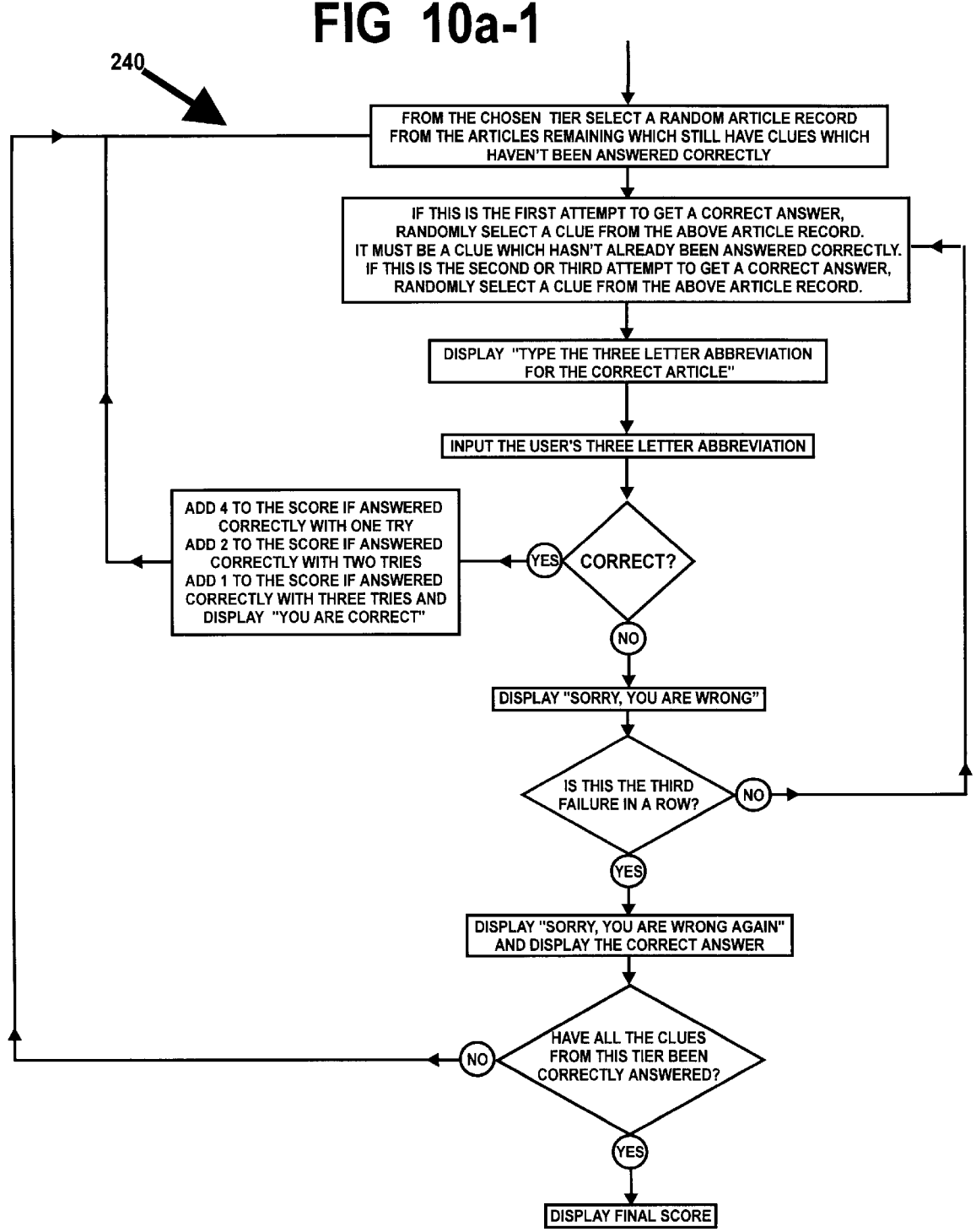

FIG. 10a shows details of fact learning with multiple clues module 240. Module 240 is the same as module 238 (FIG. 9a) except that the user is asked to select a difficulty tier.

Figure 10B:
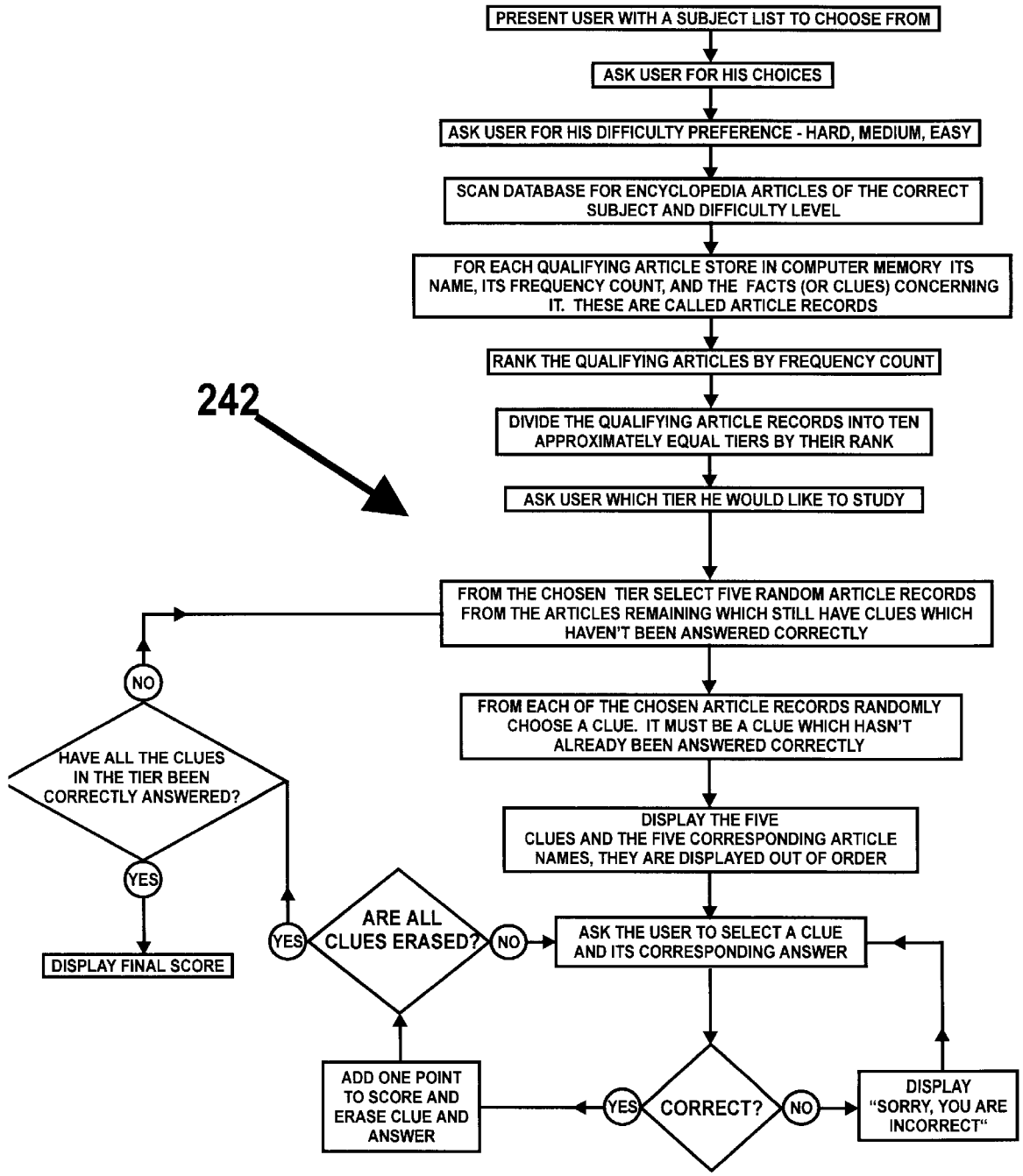
FIG. 10b is a flow diagram illustrating another learning method embodiment supported by the software components shown in FIG. 8.

FIG. 10b shows details of fact and article matching module 242, another learning module supported by database 200. Module 242 begins in the same manner as module 240, including user selection of a difficulty tier. From the chosen tier, five random article records are selected. From each of the chosen article records, a fact is randomly selected and the five facts and five corresponding article names are displayed out of order. The user is asked to "click on" a fact and its corresponding article title. If the user is correct, one point is added to the user's score and the fact and article title are erased from the screen. If the user is incorrect, there is a chance to try again. After all the facts and articles are erased, the loop is continued until all facts in the chosen tier have been answer correctly, at which time a final score is displayed.

Figure 10C:
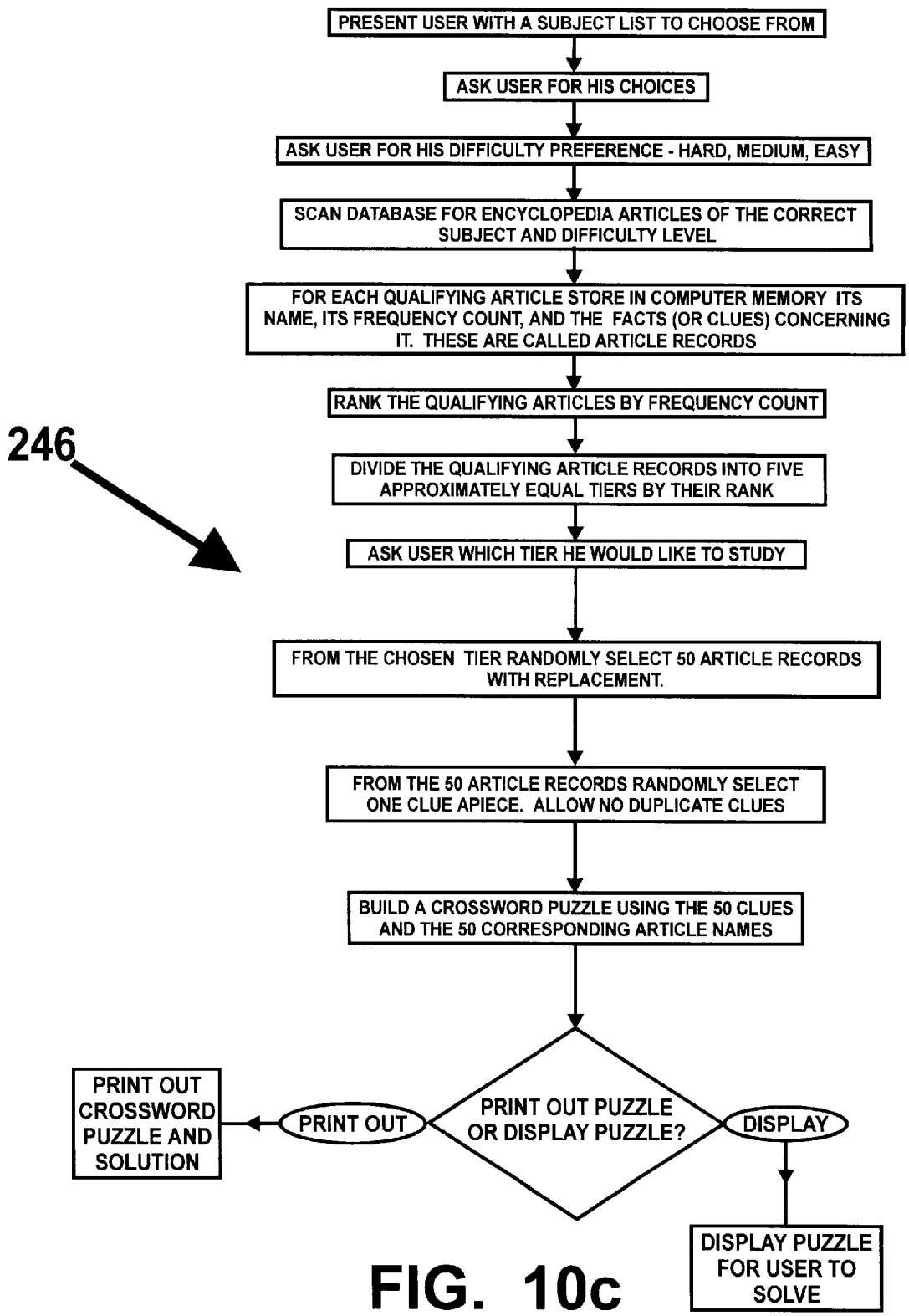
FIG. 10c is a flow diagram illustrating yet another learning method embodiment supported by the software components shown in FIG. 8.

FIG. 10c shows crossword module 246 which is similar to crossword module 152 described with reference to FIG. 7c. From a user-selected tier, fifty (50) article records are randomly selected with replacement. From the 50 article records, one fact is randomly selected from each. Using known crossword generation methods, a crossword puzzle is built using the 50 facts as clues, and the 50 corresponding article names as answers. The user can optionally print-out the crossword puzzle or solve the puzzle on the CRT screen.

Figure 10D:
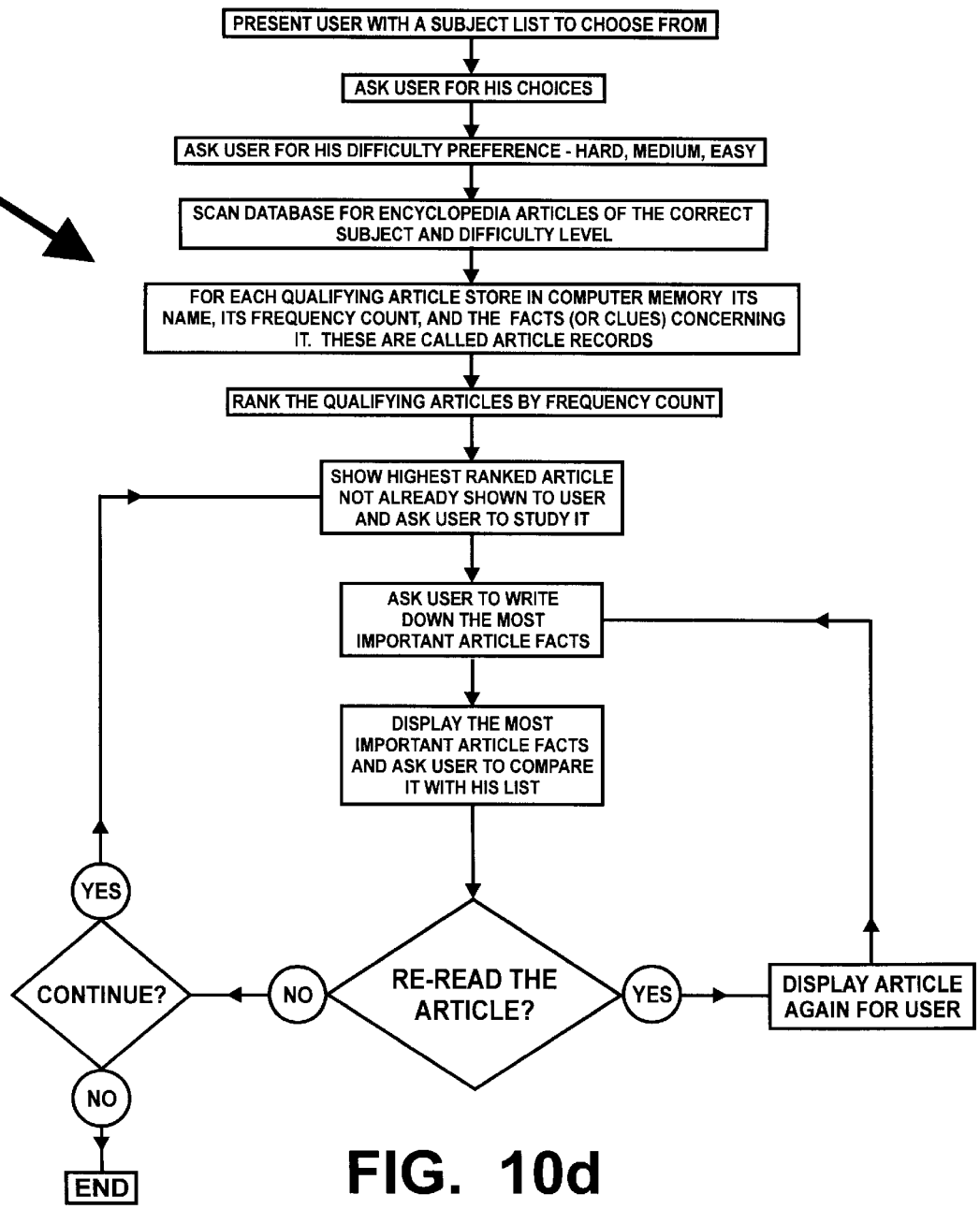
FIG. 10d is a flow diagram illustrating still another learning method embodiment supported by the software components shown in FIG. 8.

FIG. 10d shows details of guided article learning module 248, yet another learning module supported by database 200. In guided article learning module 248, the user is shown the highest ranked article from a selected subject area and asked to study the article. The user is asked to write down the most important article facts. Module 248 then displays the most important article facts as determined by knowledge expert 232 in FIG. 8. The user is then asked to compare the displayed list to the user's generated list. The object of guided learning module 248 is to give the user the most important articles first and to focus the user's attention on the most important facts within those articles.

Figure 11:
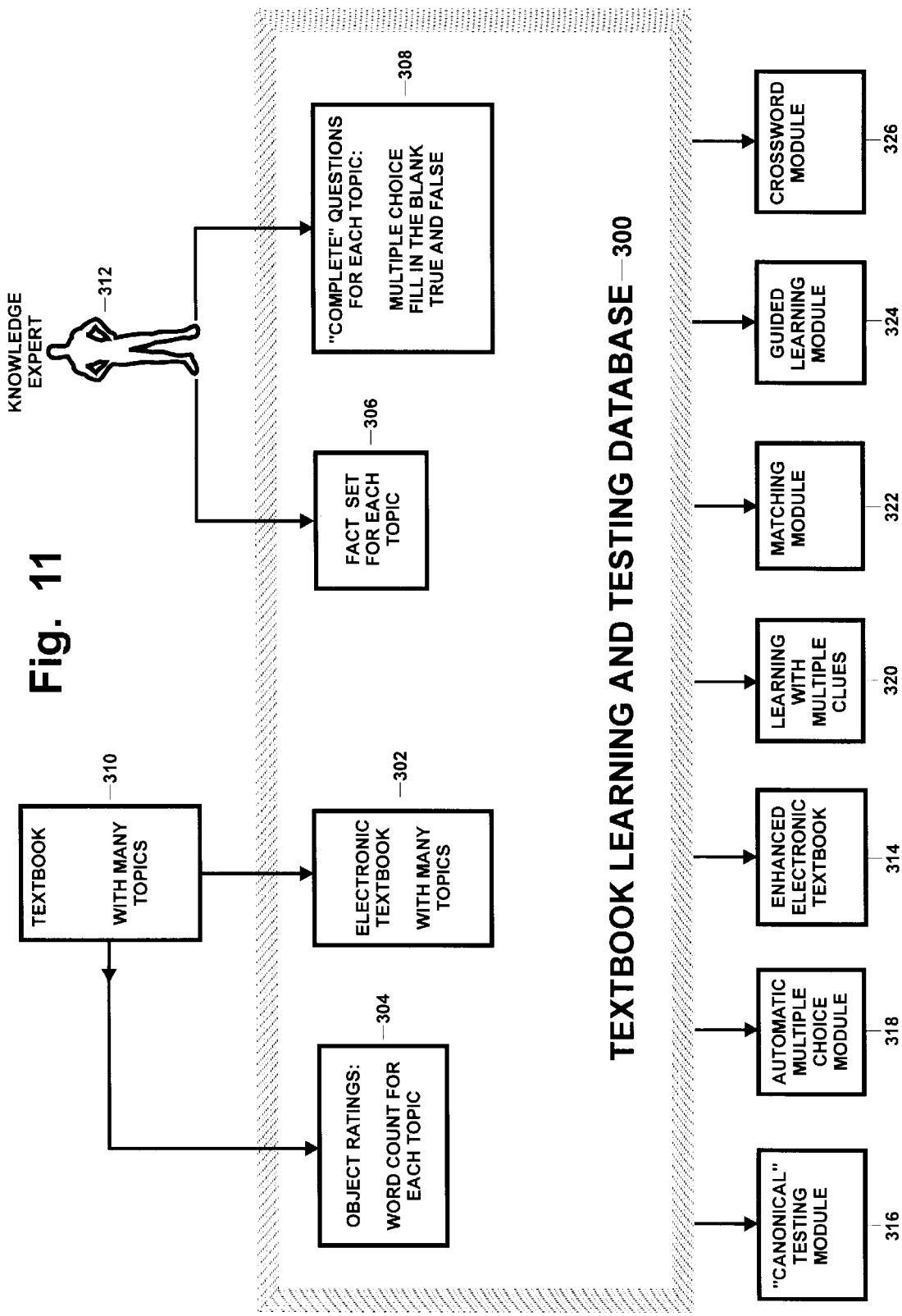
FIG. 11 is a block diagram illustrating software components of a textbook-based learning and testing system embodiment according to this invention.

Referring to FIG. 11, components of a textbook learning and testing database 300 are shown. Database 300 includes a computer-based textbook 302 having many topics. Computer-based textbook 302 is created from a standard textbook 310 in any known manner. Textbook 310 is optionally a school or college text, series of texts or any factual work dedicated to a specific subject area. Textbook 310 is also optionally a treatise or other collective work. Each topic is preferably a subdivision of the chapters of textbook 310. The topics are any logical subdivision of computer-based textbook 302, such as the words that often appear in boldface print in student texts.

Database 300 also includes objective ratings 304 for each topic in computer-based textbook 302. Objective rating 304 is preferably based on a word count for each topic as a measure of the topic's importance. Accordingly, if "quartz" has 200 words describing it in a textbook whereas "mica" only has 50 words, it is judged that quartz is four times as important as mica.

Database 300 also includes a fact set 306 for each topic as well as "complete" questions 308 for each topic. Fact set 306 and questions 308 are prepared by a knowledge expert 312. Knowledge expert 312 determines the important facts for each topic which are then recorded in fact set 306. Knowledge expert 312 also creates "complete" questions 308 for each topic. By "complete" it is meant that if a user answers the question set correctly, that user knows the topic sufficiently. Questions 308 are preferably a combination of multiple-choice, fill-in-the-blank, and/or true-and-false questions. There are preferably at least about sixty (60) questions for each chapter so that many subsets of twenty (20) questions can be selected for tests.

Database 300 provides an enhanced computer-based textbook 314 as a learning resource. Like enhanced computer-based encyclopedia 236, enhanced textbook 314 provides in addition to the text an importance rating as well as important facts from each topic. Database 300 also provides support for "Canonical" testing module 316, automatic multiple-choice module 318, learning with multiple clues module 320, matching module 322, guided learning module 324, and crossword module 326.

Figure 12:
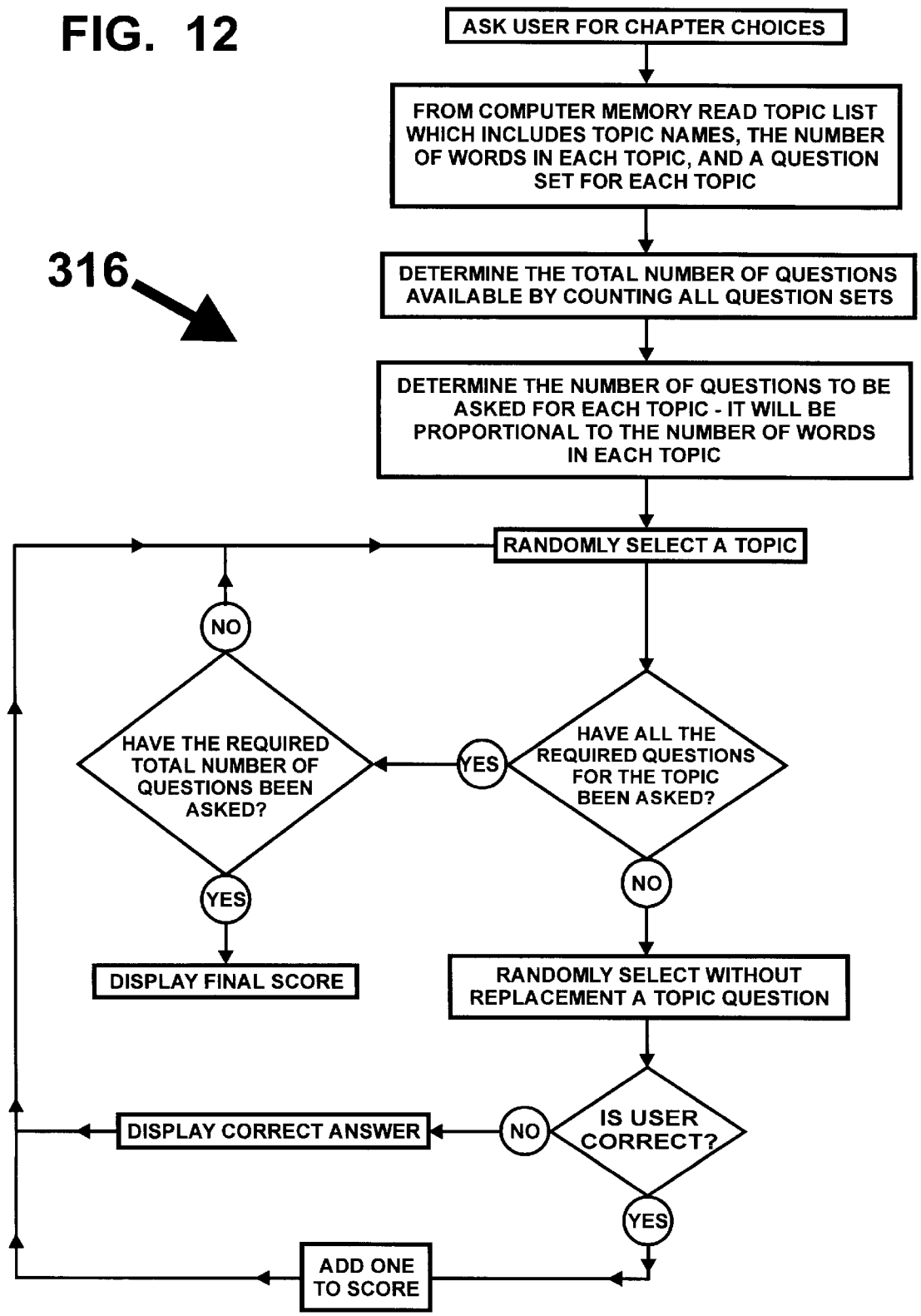
FIG. 12 is a flow diagram illustrating an embodiment of a testing method supported by the software components shown in FIG. 11.

Referring to FIG. 12, "canonical" testing module 316 from FIG. 11 is shown in detail. Testing module 316 utilizes question set 308 for each topic in database 300 to test the user's knowledge within a chapter.

In module 316, the user is asked for chapter choices. From the topic list within the chosen chapter, the total number of questions available is determined. From the total number of questions available, the number of questions to be asked for each topic is determined. This determination is made on a proportional basis. Accordingly, a topic with 1,000 words will get twice as many questions as a topic with only 500 words, reflecting their relative importance.

From the selected chapter, a topic is randomly selected. If all the required questions for the topic have not been asked, a topic question is randomly selected without replacement. If the user is correct, a point is added to the user's score. If the user is not correct, the correct answer is displayed. This loop is continued until all the required questions for the randomly selected topic have been asked and the required total number of questions has been asked, at which time a final score is displayed.

"Canonical" testing module 316 is optionally used by students to improve their knowledge and test grades. Because database 300 contains fact sets 306 and questions 308 which comprehensively cover each topic, it is likely that the subject matter of examination questions is also covered. Accordingly, student use of module 316 is excellent preparation for an examination.

A test administered using module 316 is also an educational exercise. The user is immediately made aware if a question is missed and the correct answer to each missed question are provided. Student users can retake a test provided by module 316 to measure improvement. Also, a student user optionally displays textbook topics to restudy those topics. Essentially, module 316, when used by a student, acts as a personal tutor.

Modules 318, 320, 322, 324 and 326 from FIG. 11 are similar to corresponding modules supported by encyclopedic learning and testing database 200.

In any embodiment an interactive learning and testing system and method according to this invention provides several significant benefits. The system of this invention provides a reference database including many topics. Objective ratings for each topic in the reference database allow the user to know the relative importance of each topic. The objective rating for each topic insures that an appropriate amount of emphasis will be placed on the most important topics.

This invention also provides a system and method for accurately testing a user's knowledge of each topic. The system and method of this invention provide different tests each time they are taken so that a user can be re-tested frequently to monitor progress.

The system and method of this invention also provide testing in a format that prevents cheating because each student will be taking a different version of the test. The invention also provides accurate tests at low cost with fast grading. The system and method of this invention also make testing a learning experience so as not to waste valuable class time.

This invention also enables users to learn new topics at whatever difficulty level the user selects and on whatever topic the user chooses. The system and method also permits the user to select the learning style that suits the user best.

This invention also allows "discovery learning" wherein the user is given clues until the correct answer is "discovered" by the user. Discovery learning is a teaching method having many benefits, including improved knowledge retention and transfer. Discovery learning also incorporates a sense of excitement into the learning process and heightens self-motivation.

An interactive educational system and method according to this invention cannot be outgrown by the user because of the endless selection of topics and difficulty levels. The system and method of this invention also optionally provides entertaining learning games.

Many modifications can be made to the invention without going beyond the scope or spirit of the invention. For example, the learning modules of this invention can be modified so that they can be used by two or more users simultaneously in competition or otherwise. Also, a variety of game interfaces can be added to the invention to make learning more interesting and stimulating, including speech output and speech recognition, "bells and whistles" to reward correct answers or other known optional features.

The system and method of this invention optionally provides an enhanced reference source for student and educator use. Such an enhanced reference source is optionally based upon any reference source of any type.

The following Example illustrates one embodiment of a software component of an interactive educational apparatus and method according to this invention. The Example is provided for illustrative purposes only and is not intended to define or limit the scope of the invention, which is defined separately in the Claims that follow.

EXAMPLE

Appendix A provides the source code commands for a testing module having a logic pattern similar to that of module 238 (FIG. 9a). The specific module provided in Appendix A tests the knowledge of a system user in the subject area of chemical elements. Accordingly, the reference source includes encyclopedic information regarding chemical elements. Each topic is an encyclopedic article having an article title (the chemical element name) and article text (facts regarding each chemical element).

The sample module shown in Appendix A tests the subject area of chemical elements. In a preferred embodiment, the user selects from a menu any subject area or set of subject areas wished to be studied.

Referring to Appendix A, lines 405–431 contain data statements. Lines 406–414 are data statements for the element names. Lines 422–425 are data statements for the frequency counts for each element based upon the frequency with which each element name appears in an electronic encyclopedia. These frequency counts represent an objective rating for each of the chemical elements.

The data statements store data for Basic program memory arrays. In a preferred embodiment, data is entered into the program module by reading a CD-ROM encyclopedia for the subject area or areas selected.

Lines 434–463 provide an optional exercise for the user to improve familiarity with the three letter abbreviations for each of the chemical elements. This permits the user to enter the first three letters of each chemical element rather than spelling out the entire chemical element name.

Lines 464–897 contain data statements for the most important facts (or clues) for each chemical element. Again, in a preferred embodiment, this data is stored on a CD-ROM encyclopedic disk and read into the program module.

Lines 906–930 contain source code commands for ranking each of the chemical elements by their frequency count. The chemical elements are divided into five tiers containing ten chemical elements each.

In lines 964–971, the system user is asked to choose a difficulty level; hard, medium or easy. If the user chooses the "easy" difficulty level, 30 questions are provided based on the first tier which includes the most common chemical elements, and the user is shown the ten element names that are in that tier. If the user chooses the "medium" difficulty level, ten questions are asked from the first three tiers. Finally, if the "hard" difficulty level is chosen, the system user is asked five questions from each of the five tiers.

In remaining lines 976–1070, questions are asked and scored as indicated in FIG. 9a.

```
400    REM ELEMENTS.BAS JUNE 21,1994
401    REM copyright 1994 by Brad Sheppard, Jr.
402    REM TESTS KNOWLEDGE OF CHEMICAL ELEMENTS
403    DEFINT A-T
404    DIM ELEM$(52), CLUENO(52), CLUE$(52, 15), ELAB$(52), CLUE(52, 15), FREQ(52)
405    REM BELOW ARE THE ELEMENT NAMES . . .
406    DATA "ALUMINIUM", "ANTIMONY", "ARGON", "ARSENIC", "BARIUM", "BERYLLIUM"
407    DATA "BISMUTH", "BORON", "BROMINE", "CADMIUM", "CALCIUM", "CARBON", "CESIUM"
408    DATA "CHLORINE", "CHROMIUM", "COBALT", "COPPER", "FLUORINE", "GERMANIUM"
409    DATA "GOLD", "HELIUM", "HYDROGEN", "IODINE", "IRON", "LEAD", "LITHIUM"
410    DATA "MERCURY", "MAGNESIUM", "MANGANESE", "MOLYBDENUM", "NEON", "NICKEL"
```

-continued

```
411    DATA "NITROGEN", "OXYGEN", "PHOSPHORUS", "PLATINUM", "PLUTONIUM"
412    DATA "POTASSIUM", "RADIUM", "RADON", "SELENIUM", "SILICON", "SILVER"
413    DATA "SODIUM", "SULFUR", "THORIUM", "TIN", "TITANIUM", "TUNGSTEN"
414    DATA "URANIUM", "VANADIUM", "ZINC"
415    REM DONE WITH ELEMENT NAMES DATA STATEMENTS . . .
416    CLS 'CLEAR SCREEN
417    FOR j = 1 TO 52 'READ elements
418    READ ELEM$(j)
419    NEXT j
420    REM
421    REM NOW USE DATA STATEMENTS TO STORE ELEMENT FREQUENCY NUMBERS ffffffffffff
422    DATA 271,50,68,42,74,45,38,77,79,68,405,1213,50,413,125,125,962
423    DATA 152,43,1502,258,918,150,2001,653,96,480,226,233,72,53,226
424    DATA 638,1530,172,137,92,305,73,38,47,265,961,528,655,53,338
425    DATA 85,111,367,40,340
426    FOR j = 1 TO 52     'READ 52 ELEMENT FREQUENCIES INTO FREQ0
427    READ FREQ(j)
428    NEXT j
429    REM FINISHED USING DATA STATEMENTS TO STORE ELEMENT FREQUENCY NUMBERS
430    ffffffff
431    FOR j = 1 TO 52      'INPUT ELEM ABBREV INTO ARRAY ELAB(52) aaaaaa
432    ELAB$(j) = LEFT$(ELEM$(j), 3)
433    NEXT j      'FINISHING INPUTING ELEM ABBREV.aaaaaaaaaaaaa
434    REM - NOW DO A OPTIONAL EXERCISE TO HELP USER DO 3 LETTER ABBREVIATIONS oooo
435    PRINT "FOR THE FOLLOWING QUESTIONS TYPE THE FIRST THREE LETTERS OF THE"
436    PRINT
437    PRINT "ELEMENT. EXAMPLE HELIUM = HEL IRON = IRO NITROGEN = NIT"
438    PRINT
439    PRINT "TYPE Y IF YOU WANT TO DO A PRACTICE EXERCISE ON ABBREVIATIONS"
440    INPUT X$
441    IF (UCASE$(X$) <> "Y") THEN GOTO 330      'SKIP
442    RANDOMIZE TIMER
443    310    FOR J = 1 TO 10     'DO TEN ELEMENTS
444    PRINT "TYPE THE THREE LETTER INITIAL FOR THIS ELEMENT"
445    RAND = INT(50 * RND) + 1
446    PRINT ELEM$(RAND)
447    INPUT ANS$
448    IF (UCASE$(ANS$)    ELAB$(RAND)) THEN GOTO 340 'FAILURE
449    PRINT "GOOD JOB, YOU ARE CORRECT"
450    GOTO 350
451    340 PRINT "WHOOPS, YOU ARE WRONG"
452    PRINT "THE CORRECT ANSWER IS", ELAB$(RAND)
453    BEEP
454    PRINT "TYPE ANY KEY TO CONTINUE"
455    DO
456    X$ = INKEY$
457    LOOP UNTIL (X$ <> "")
458    350 NEXT j%
459    PRINT "TYPE Y IF YOU'D LIKE TO REPEAT THIS EXERCISE"
460    INPUT X$
461    IF (UCASE$(X$) = "Y") THEN GOTO 310
462    330    CLS
463    REM - FINISHED PRACTICE ABBREVIATION EXERCISE aaaaaaaaaaaaaaaaaaaaaaaaaaaaaa
464    REM now read in the number of clues in each element
465    DATA 7,4,4,5,6,4,3,5,4,3,9,10,4,8,4,4,8,7,4,10,7,10
466    DATA 7,10,9,7,10,6,3,3,4,3,8,9,7,5,3,8,5,3,4,8,6,9,10
467    DATA 3,8,5,4,4,4,7
468    FOR j = 1 TO 52    'READ NUMBER OF CLUES FOR EACH element
469    READ CLUENO(j).
470    REM PRINT j, CLUENO(j);
471    REM IF (j MOD 3 = 0) THEN PRINT
472    NEXT j
473    REM INPUT x
474    REM NOW READ IN THE CLUES FOR EACH element INTO CLUE$(50,15)
475    CLS
476    REM now do aluminum
477    DATA "metallic element whose symbol is Al, atomic number 13
478    DATA "common metallic element which combines light weight, strength, and corrosion   resistance."
479    DATA "alloys of this metal have the highest strength to weight ratio of any commercial metal."
480    DATA "over 90% of transmission lines are made from this light metal."
481    DATA "this metallic element is derived from bauxite."
482    DATA "The most abundant metallic element in the Earth's crust."
483    DATA "The third most common element in the Earth's crust."
484    REM now do antimony 2
485    DATA "this metalloid elements symbol is Sb, atomic number 51"
486    DATA "This metalloid element is the fourth member of Group Va of the periodic tables whose first two
487    members are nitrogen and phosphorus."
488    DATA "Stibnite is the principal ore of the metalloid element."
489    DATA "When liquified this metalloid element has the exceptional property of expanding when it
490    solidifies."
```

-continued

| | |
|---|---|
| 491 | REM now do argon 3 |
| 492 | DATA "This inert gaseous element has a symbol of Ar, atomic number 18." |
| 493 | DATA "This inert gas is the third member in group 0 of the periodic table. It begins with an A. |
| 494 | DATA "This inert gas is the most abundant one in air. It comprises .94% of air." |
| 495 | DATA "This inert gas beginning with an A is used to fill electric light bulbs." |
| 496 | REM now do arsenic 4 |
| 497 | DATA "This metalloid element's symbol is As, atomic number 33. |
| 498 | DATA "This metalloid element is the next member of group Va of the period table which begins with |
| 499 | nitrogen and phosphorus." |
| 500 | DATA "This metalloid element's chief ores are arseno pyrite and realgar." |
| 501 | DATA "This metalloid element is a strong poison. It is in group Va along with nitrogen and |
| 502 | phosphorus." |
| 503 | DATA "This metalloid element is a strong poison, compounds of it are used as poison gas." |
| 504 | REM now do Barium 5 |
| 505 | DATA "This metallic element's symbol is Ba, atomic number 56." |
| 506 | DATA "This group IIa metallic element is in the same group as Magnesium and calcium. It begins with |
| 507 | the letter B." |
| 508 | DATA "Barite contains this metallic element." |
| 509 | DATA "This is the heaviest of the group IIa elements which include magnesium and calcium." |
| 510 | DATA "Compounds of the group IIa element beginning with a B are used in rat poison and fireworks." |
| 511 | DATA "Although it is the 14th most common element in the Earth's crust, it has few uses uncombined. |
| 512 | It begins with a B." |
| 513 | REM now do Beryllium 6 |
| 514 | DATA "This metallic element's symbol is Be, atomic number 4." |
| 515 | DATA "This rare metallic element is the first member of the alkaline-earth metal,s group IIa." |
| 516 | DATA "This metallic element beginning with a B is lighter and stronger than aluminum. However, it is |
| 517 | quite expensive." |
| 518 | DATA "The second lightest metallic element, it begins with a B." |
| 519 | REM now do Bismuth 7 |
| 520 | DATA "This metallic element's symbol is Bi, atomic number 83" |
| 521 | DATA "This metallic element has a pinkish tinge; it is the only metal besides gold and copper that is not |
| 522 | silver white. It begins with a B." |
| 523 | DATA "Among non radioactive elments, this element has both the highest atomic number and atomic |
| 524 | weight. It begins with a B." |
| 525 | REM now do Boron 8 |
| 526 | DATA "This metalloid element's symbol is B, atomic number 5." |
| 527 | DATA "Although this metalloid element is in the same group IIIa as aluminum, it is actually more like |
| 528 | carbon." |
| 529 | DATA "This metalloid element is the first member of group IIIa of the periodic table whose following |
| 530 | member is aluminum." |
| 531 | DATA "Borax is a compound of this metalloid element." |
| 532 | DATA "This metalloid element is used in control rods for nuclear reactors. Its atomic number is 5." |
| 533 | REM now do Bromine 9 |
| 534 | DATA "This non-metallic element's symbol is Br, atomic number 35." |
| 535 | DATA "This non-metallic element is a halogen in group VIIa. It is the third member after fluorine and |
| 536 | chlorine." |
| 537 | DATA "This element is a halogen. It is a dark red liquid at room temperature that gives off a poisonous |
| 538 | vapor." |
| 539 | DATA "This is the only non-metallic element that is a liquid at room temperature." |
| 540 | REM now do Cadmium 10 |
| 541 | DATA "This metallic element's symbol is Cd, atomic number 48." |
| 542 | DATA "The principle use of this silver white metal is as a coating on iron to prevent corrosion. It begins |
| 543 | with a C." |
| 544 | DATA "THis metallic element, atomic number 48, is used as a coating on iron to prevent corrosion." |
| 545 | REM now do calcium 11 |
| 546 | DATA "This metallic element's symbol is Ca, atomic number 20." |
| 547 | DATA "A silver white, malleable alkaline-earth metal." |
| 548 | DATA "The fifth most abundant element in the Earth's crust, almost as common as iron." |
| 549 | DATA "The name of this element is derived from the mineral Calcite." |
| 550 | DATA "This metallic element is essential for strong bones and teeth." |
| 551 | DATA "Limestone contains this metallic element." |
| 552 | DATA "This metallic element helps regulate the heartbeat and is necessary for clotting." |
| 553 | DATA "Lime contains this metallic element." |
| 554 | DATA "An alkaline earth metal, group IIa, which also includes barium and strontium. It beings with the |
| 555 | letter C." |
| 556 | REM now do Carbon, no. 12 |
| 557 | DATA "This non-metallic element's symbol is C, atomic number 6." |
| 558 | DATA "A diamond is made of this element." |
| 559 | DATA "Graphite is made of this element." |
| 560 | DATA "94 percent of all known compounds contain this element. (Not Oxygen.)" |
| 561 | DATA "The most versatile element known." |
| 562 | DATA "The lightest member of group IVa which also contains silicon, germanium, tin, and lead." |
| 563 | DATA "We inhale oxygen, we exhale __ dioxide." |
| 564 | DATA "A form of this element is the hardest natural substance known." |
| 565 | DATA " __ monoxide is a poisonous gas found in car exhaust." |
| 566 | DATA "The sixth most abundant element in the universe, it plays an important role in the thermonuclear |
| 567 | burning of hydrogen." |
| 568 | REM now do Cesium, no. 13 |
| 569 | DATA "This metallic elements symbol is Cs, atomic number 55." |
| 570 | DATA "The heaviest of the alkali earth metals, group Ia, whose other members include sodium and |

-continued

| | |
|---|---|
| 571 | potassium." |
| 572 | DATA "This soft as wax metal is the most alkaline element and the most reactive." |
| 573 | DATA "This heavy alkali metal emits electrons readily when exposed to light." |
| 574 | REM now do Chlorine, no. 14 |
| 575 | DATA "This element's symbol is Cl, atomic number 17." |
| 576 | DATA "This element is a greenish yellow poisonous gas with a disagreeable odor." |
| 577 | DATA "The second member of the halogens, group VIIa, which also includes fluorine, bromine, and |
| 578 | iodine." |
| 579 | DATA "Table salt is a compound of sodium and __. " |
| 580 | DATA "Hitler suffered from a poisonous gas during WWI which was this chemical element." |
| 581 | DATA "This gaseous halogen element is an important bleaching agent." |
| 582 | DATA "The halogen element with the most commercial uses." |
| 583 | DATA "Municipal water is often treated with this gaseous halogen element." |
| 584 | REM now do Chromium no. 15 |
| 585 | DATA "This metallic element's symbol is Cr, atomic number 24." |
| 586 | DATA "This metallic element's name came from the Greek word chroma, (color), because of the many |
| 587 | colors of its compounds." |
| 588 | DATA "Chromite is the most important ore of this element." |
| 589 | DATA "Because it is hard and non-tarnishing, this metallic element beginning with a C is used to plate |
| 590 | other metals, It is often used as body trim." |
| 591 | REM now do Cobalt no. 16 |
| 592 | DATA "A metallic element, symbol Co, atomic number 27" |
| 593 | DATA "A radioactive isotope of this metallic element beginning with a C is a widely used radiation |
| 594 | source." |
| 595 | DATA "Cobalite is an important ore for this metallic element." |
| 596 | DATA "Along with iron and nickel, this metallic element is also magnetic." |
| 597 | REM no do Copper no. 17 |
| 598 | DATA "This metallic element'symbols is Cu, atomic number 29." |
| 599 | DATA "This red metallic element was the first metal used by humans." |
| 600 | DATA "This reddish metal can be found as a native element - that is, uncombined in nature." |
| 601 | DATA "This metal is the one most used in electrical wires." |
| 602 | DATA "Only silver is a better conductor than this common metal." |
| 603 | DATA "Brass is made from zinc and __. " |
| 604 | DATA "A transition metal which belongs to group Ib along with silver and gold, but much less |
| 605 | valuable." |
| 606 | DATA "A reddish, malleable metal which is a good conductor of heat and electricity." |
| 607 | REM - no do fluorine, no 18 |
| 608 | DATA "This non-metallic element's symbols is f, atomic number 9." |
| 609 | DATA "The lightest of the halogens, group VIIa, whose other members include chlorine and bromine." |
| 610 | DATA "The most chemically active non metal." |
| 611 | DATA "The addition of one part per million of compounds of this element to drinking water reduces |
| 612 | tooth decay." |
| 613 | DATA "The most electronegative of all elements." |
| 614 | DATA "Fluorite is the chief commercial source of this element." |
| 615 | DATA "Teflon is derived from this highly reactive halogen." |
| 616 | REM - now do germanium, no. 19 |
| 617 | DATA "This metalloid element's symbol is Ge, atomic number 32." |
| 618 | DATA "This metalloid element is the third member of group IVa whose first two members are carbon and |
| 619 | silicon." |
| 620 | DATA "Suitable prepared crystals of this metalloid element will pass electricity in one direction only. It |
| 621 | begins with a G." |
| 622 | DATA "This metalloid element is a semiconductor. It is in the same periodic group IVa as is silicon, but it |
| 623 | is heavier." |
| 624 | REM - now do gold, 20 |
| 625 | DATA "This metallic element's symbol is Au, atomic number 79." |
| 626 | DATA "A very valuable yellow metal element used in coins throughout the ages." |
| 627 | DATA "The most malleable metal, it can be pressed into very thin sheets." |
| 628 | DATA "Only silver and copper conduct electricity better than this valuable metal." |
| 629 | DATA "Alchemists tried to transmute baser metals such as lead into this metallic element." |
| 630 | DATA "European exploration of the New World was motivated by the search for this valuable metal." |
| 631 | DATA "The purity of this metal is measured in carats." |
| 632 | DATA "A transition metal which belongs to group Ib along with silver and copper, but more valuable." |
| 633 | DATA "This group Ib transition metal has an extremely high resistance to corrosion." |
| 634 | DATA "This valuable metal is found in nature as dust, nuggets, or flakes." |
| 635 | REM now do Helium, 21 |
| 636 | DATA "This element's symbol is He, atomic number two." |
| 637 | DATA "The first and lightest member of the novel gases, group O." |
| 638 | DATA "The name of this element was derived from helios, meaning sun." |
| 639 | DATA "This gaseous element is second only to hydrogen in its abundance in the universe." |
| 640 | DATA "This gaseous element is formed from the nuclear fusion of hydrogen." |
| 641 | DATA "gaseous element is formed from the nuclear fusion of hydrogen." |
| 642 | DATA "Deep sea divers breath a mixture of 80% __ and 20% oxygen. It makes them talk in a high |
| 643 | pitched voice." |
| 644 | REM now do hydrogen, 22 |
| 645 | DATA "This gaseous element's symbol is H, atomic number 1." |
| 646 | DATA "This first element in the periodic table, atomic number 1." |
| 647 | DATA "The most abundant element in the universe, it makes up more than 90% of all atoms." |
| 648 | DATA "The major fuel in the nuclear fusion reaction of the stars." |
| 649 | DATA "Tritium is a radioactive gas which is an isotope of __." |
| 650 | DATA "Combined together with oxygen this element makes water." |

-continued

| | |
|---|---|
| 651 | DATA "An invisible, flammable gas used in balloons." |
| 652 | DATA "This element has the simplest atomic structure of all elements." |
| 653 | DATA "All acids contain this element." |
| 654 | DATA "Although formally this element is the lightest member of the alkali metals, group Ia, it is really a |
| 655 | unique element." |
| 656 | REM now do Iodine,23 |
| 657 | DATA "Although formally this element is the lightest member of the alkali metals, group Ia, it is really a |
| 658 | DATA "This is the first member of the halogens, group VIIa, to be a solid at room temperature." |
| 659 | DATA "The fourth member of the halogen group, the first three are fluorine, chlorine, and bromine." |
| 660 | DATA "This non metallic element sublimes when heated, giving off a violet vapor with a stinging odor." |
| 661 | DATA "This halogen element is an essential trace element. It is present in a hormone of the thyroid |
| 662 | gland." |
| 663 | DATA "The least chemically active of the halogen elements." |
| 664 | DATA "Inadequate dietary supply of this halogen element results in goiter, a swelling of the thyroid." |
| 665 | REM now do Iron, 24 |
| 666 | DATA "This metallic element symbol is Fe, atomic number 25" |
| 667 | DATA "This metallic element is the second most common metal in the Earth's crust. The most common |
| 668 | metal is aluminum." |
| 669 | DATA "This metallic element is believed to be the main component of the Earth's core." |
| 670 | DATA "Limonite, hematite, and magnetite are ores of this metallic element." |
| 671 | DATA "When this metallic element is alloyed with carbon it becomes steel." |
| 672 | DATA "Anemia is caused by a deficiency of this metallic element." |
| 673 | DATA "This common metallic element rusts readily in moist air." |
| 674 | DATA "This metallic element is a crucial component of hemoglobin." |
| 675 | DATA "This metallic element is the most important commercially." |
| 676 | DATA "After the copper age and the bronze age came the __ age." |
| 677 | REM now do lead, 25 |
| 678 | DATA "This metallic element symbol is Pb, atomic number 82." |
| 679 | DATA "A common, very dense, soft metallic element." |
| 680 | DATA "This common heavy metallic element has many poisonous compounds." |
| 689 | DATA "This metallic element's symbol is Li, atomic number 3." |
| 690 | DATA "This metallic element is the third member in the periodic table, atomic number 3" |
| 691 | DATA "This metallic element is the lightest of the alkali metals, group 1a. Other members include |
| 692 | sodium and potassium." |
| 693 | DATA "The lightest metallic element." |
| 694 | DATA "This alkali metal element reacts violently with water. It begins with an L." |
| 695 | DATA "The carbonhate of this alkali metal element is used in treating manic depressives." |
| 696 | DATA "The least dense metal." |
| 697 | REM now do mercury, 27 |
| 698 | DATA "The symbol of this metallic element is Hg, atomic number 80." |
| 699 | DATA "The only common metallic element that is a liquid at room temperature." |
| 700 | DATA "This metallic element shares group IIb with zinc and cadmium, but it is heavier than them." |
| 701 | DATA "Lead will float on the surface of this metallic element." |
| 702 | DATA "This metallic element is the silver liquid in thermometers." |
| 703 | DATA "This metallic element is also known as quicksilver." |
| 704 | DATA "This element is the only one named after a planet." |
| 705 | DATA "The amalgam used in dental fillings consists of tin and silver dissolved in this metallic element." |
| 706 | DATA "This metallic element beginning with an M is highly poisonous." |
| 707 | DATA "The principle ore of this metallic element is cinnabar." |
| 708 | REM now do magnesium, 28 |
| 709 | DATA "This metallic element's symbol is Mg, atomic number 12." |
| 710 | DATA "This is the second member of the alkaline-earth metals, group IIa, whose other members include |
| 711 | beryllium and calcium." |
| 712 | DATA "This silver white, light alkaline-earth element is the sixth most abundant element in the Earth's |
| 713 | crust." |
| 714 | DATA "This light weight silver metal is highly flammable and burns with a brilliant white light." |
| 715 | DATA "This metallic element beginning with a M is used to make light weight, high strength alloys." |
| 716 | DATA "Besides calcium, this light weight alkaline earth metal is an essential constituent of living |
| 717 | tissue." |
| 718 | REM now do manganese, 29 |
| 719 | DATA "This metallic element's symbol is Mn, its atomic number 25." |
| 720 | DATA "The principle use of this transition element, group VIIb, is in alloys with iron. It begins with the |
| 721 | letter M." |
| 722 | DATA "This metallic element is a unique deoxidizing agent used in the manufacture of steel. It begins |
| 723 | with M." |
| 724 | REM now do molybdenum, 30 |
| 725 | DATA "A metallic element whoise symbol is Mo, atomic number 42." |
| 726 | DATA "This metallic element's principal ores are molybenite and wulfrenite." |
| 727 | DATA "The chief use of this metallic element beginning with a M is in alloying steel." |
| 728 | REM now do neon, 31 |
| 729 | DATA "This gaseous element's symbol is Ne, atomic number 10." |
| 730 | DATA "The next lightest noble gas element after Helium." |
| 731 | DATA "This group VIIIa noble gas element begins with a N." |
| 732 | DATA "This noble gas element produces a crimson glow in a vacuum electric discharge tube." |
| 733 | REM now do nickel, 32 |
| 734 | DATA "This metallic element's symbol is Ni, atomic number 28." |
| 735 | DATA "Besides iron, many meteorites also contain this metal." |
| 736 | DATA "The chief use of this metallic element is in the preparation of alloys. Its name starts with N." |
| 737 | REM now do nitrogen, 33 |
| 738 | DATA "This gaseous element's symbol is N, atomic number 7." |

-continued

| | |
|---|---|
| 739 | DATA "This element makes up 78 percent of air." |
| 740 | DATA "Nitric acid is made from hydrogen, oxygen and __?" |
| 741 | DATA "The lightest member of group Va which also includes phosphorus and arsenic." |
| 742 | DATA "The name of this gaseous element is derived from the Greek words nitron & genes which means |
| 743 | saltpeter producing." |
| 744 | DATA "The most abundant uncombined element on the Earth's surface." |
| 745 | DATA "The primary use of this gaseous element is in the synthesis of ammonia." |
| 746 | DATA "Laughing gas is a compound of oxygen and __?" |
| 747 | REM now do oxygen, 34 |
| 748 | DATA "This gaseous element's symbol is O, atomic number 8." |
| 749 | DATA "This is the first element in Group Va which also includes sulfur and selenium." |
| 750 | DATA "This is the most abundant element on the Earth's surface." |
| 751 | DATA "This element makes up 20% of air." |
| 752 | DATA "Ozone is a highly reactive allotrope of __?" |
| 753 | DATA "This element is the most common oxidizer in liquid fuel rockets." |
| 754 | DATA "This element accounts for 89% of the mass of the oceans." |
| 755 | DATA "Plants convert carbon dioxide to carbon and __?" |
| 756 | DATA "Hemoglobin carries __ from the air through our bodies." |
| 757 | REM now do phosphorus, 35 |
| 758 | DATA "A non-metallic element, symbol p, atomic number 15." |
| 759 | DATA "A group Va element, other members include nitrogen and arsenic. Its name begins with a P." |
| 760 | DATA "The white form of this non-metallic element ignites spontaneously in air, the red form is used in |
| 761 | matches." |
| 762 | DATA "Together with calcium, this group Va element is essential for bones." |
| 763 | DATA "The white form of this non-metallic element must be stored underwater and is poisonous." |
| 764 | DATA "Apatite is the principle source of this non-metallic element." |
| 765 | DATA "The most important commercial use of this non-metallic group Va element that comes after |
| 766 | nitrogen is for fertilizers." |
| 767 | REM now do platinum, 36 |
| 768 | DATA "This metallic element's symbol is Pt, atomic number 78." |
| 769 | DATA "This very valuable metallic element is one of the transition elements in group VIIIb. It begins |
| 770 | with a P." |
| 771 | DATA "This very valuable metallic element has been found its nuggets weighing up to 9.5 Kg. It is not |
| 772 | gold or silver." |
| 773 | DATA "The most important use of this very valuable metallic element is as a catalyst." |
| 774 | DATA "This metallic element can be as valuable as gold. It is grayish-white and used in jewelery." |
| 775 | REM now do plutonium, 37 |
| 776 | DATA "This radioactive metallic element's symbol is Pu, atomic number 94, a transuranium |
| 777 | element." |
| 778 | DATA "The most economically important of the transuranium elements, it is made by bombarding |
| 779 | 238 with slow neutrons." |
| 780 | DATA "This man made element is used in nuclear reactors and atomic bombs. It is extremely |
| 781 | poisonous." |
| 782 | REM now do potassium, 38 |
| 783 | DATA "The symbol for this metallic element is K, atomic number 19." |
| 784 | DATA "A soft, extremely reactive alkali metal, its name begins with a P." |
| 785 | DATA "Besides sodium, this alkali metal is an essential nutrient." |
| 786 | DATA "Saltpeter, used in gunpowder, is __ nitrate." |
| 787 | DATA "This alkali metal is the seventh most common element in the Earth's crust. It is not sodium." |
| 788 | DATA "This metal reacts violently with water and begins with a P." |
| 789 | DATA "This alkali metal is found in nature in large quantities. It is denser than sodium." |
| 790 | DATA "Potash refers to compounds of this metallic element." |
| 791 | REM now do Radium, 39 |
| 792 | DATA "This metallic element's symbol is Ra, atomic number 88." |
| 793 | DATA "This metallic element is the sixth and final member of the alkaline earth metals. It is radioactive." |
| 794 | DATA "This metallic element's name came from the Latin word radius, meaning ray." |
| 795 | DATA "Marie Curie first isolated this element as a pure metal. It is radioactive." |
| 796 | DATA "A salt of this metallic element was once widely used as a luminescent paint for watch dials." |
| 797 | REM now do radon, 40 |
| 798 | DATA "This element is an inert gas. Its symbol is Rn, its atomic number is 86." |
| 799 | DATA "This element is the 6th and final member of the inert gas series. It is radioactive." |
| 800 | DATA "Unsafe levels of this gaseous element have been discovered in a number of homes. Decay of |
| 801 | radium generates it." |
| 802 | REM no do selenium, 41 |
| 803 | DATA "This element's symbol is Se, its atomic number 34." |
| 804 | DATA "This element is the 3rd member of the chalcogen group VIa of the periodic table. It comes after |
| 805 | oxygen and sulfur." |
| 806 | DATA "This element's names comes from the Greek selene, meaning moon." |
| 807 | DATA "This element is the third member of the chalcogen group VIa. It exhibits both photovoltaic and |
| 808 | photoconductive action." |
| 809 | REM now do silicon, 42 |
| 810 | DATA "This metalloid element's symbol is Si, atomic number 14." |
| 811 | DATA "This metalloid element is the next member after carbon in group IVa, its atomic number is 14." |
| 812 | DATA "With the exception of oxygen this metalloid element is the most abundant in the Earth's crust." |
| 813 | DATA "Sand is made of __ dioxide." |
| 814 | DATA "The silicates, the largest mineral group, are made from this metalloid element." |
| 815 | DATA "This element is a semiconductor and is used in computer chips and solar cells. Its atomic number |
| 816 | is 14." |
| 817 | DATA "Silicones are derived from this metalloic element." |
| 818 | DATA "This metalloid element is important for making steel alloys. Its atomic number is 14." |

-continued

| | |
|---|---|
| 819 | REM now do silver, 43 |
| 820 | DATA "A valuable metallic element, symbol Ag, atomic number 47 |
| 821 | DATA "A prized metallic element similar to gold but more common and more reactive." |
| 822 | DATA "A white and shiny metallic element that was one of the first metals used by man." |
| 823 | DATA "Besides gold, the most malleable and ductile metallic element." |
| 824 | DATA "A transition metal that belongs to group Ib along with copper and gold, with an atomic number |
| 825 | between them." |
| 826 | DATA "The best conductor of heat and electricity." |
| 827 | REM now do sodium, 44 |
| 828 | DATA "This metallic element's symbol is Na, atomic number 11." |
| 829 | DATA "The second member of the alkali metals, group Ia, whose first member is lithium." |
| 830 | DATA "Table salt is made of chlorine and this metallic element." |
| 831 | DATA "This highly reactive alkali metal is the seventh most common element in the Earth's crust." |
| 832 | DATA "World consumption of this alkali metal's compounds are in the same range as iron." |
| 833 | DATA "This metallic element can be cut with a knife, reacts violently with water, and begins with an S." |
| 834 | DATA "Consuming too much of this alkali metal's compounds can raise your blood pressure." |
| 835 | DATA "The vapors of this alkali metal element are used in highway lamps." |
| 836 | DATA "Baking soda is __ bicarbonate." |
| 837 | REM now do sulfur, 45 |
| 838 | DATA "This non-metallic element's symbol is S, atomic number 16." |
| 839 | DATA "This is a common yellow, non-metallic element." |
| 840 | DATA "A group VI element, it is heavier than oxygen but lighter than selenium." |
| 841 | DATA "This non-metallic element is found in nature, especially around volcanoes, and burns with a |
| 842 | strong odor." |
| 843 | DATA "This mineral element has been known since antiquity as brimstone." |
| 844 | DATA "Besides carbon and saltpeter, this element is used in gunpowder." |
| 845 | DATA "This is the native (found in nature) non-metallic element with the lowest melting point." |
| 846 | DATA "A soft yellow element found in volcanic regions." |
| 847 | DATA "Fumes from burning this yellow element are used for fumigation." |
| 848 | DATA "The most important industrial acid is derived from this yellow element." |
| 849 | REM now do thorium, 46 |
| 850 | DATA "A radioactive element, symbol Th, atomic number 90, a member of the actinide series." |
| 851 | DATA "The major ores of this actinide series element are thorite and thoriamite." |
| 852 | DATA "This radioactive metallic element is under study as a potential atomic fuel source because |
| 853 | bombardment with neutrons yield U-233." |
| 854 | REM now do tin, 47 |
| 855 | DATA "This metallic element's symbol is Sn, atomic number 50." |
| 856 | DATA "This metallic element belongs to group IVa along with carbon and germanium. Its name has three |
| 857 | letters." |
| 858 | DATA "Bronze is an alloy of copper and __?" |
| 859 | DATA "Cassiterite is the cheif ore of this metallic element." |
| 860 | DATA "A lustrous, silver-white very soft metal that can be hammered into very thin sheets, but it isn't |
| 861 | silver." |
| 862 | DATA "Pewter's main component is the metallic element __?" |
| 863 | DATA "Commonly used solders are an alloy of lead and __?" |
| 864 | DATA "The main use of this metallic element is for plating steel cans." |
| 865 | REM now do titanium, 48 |
| 866 | DATA "This metallic element's symbol is Ti, its atomic number 22." |
| 867 | DATA "This metallic element was named after the Greek Titans for their legendary strength." |
| 868 | DATA "This metallic element beginning with a T is light in weight and high in strength." |
| 869 | DATA "Compressor blades of jet engines are made from this metallic element beginning with a T." |
| 870 | DATA "The Apollo capsule is mainly made of this metallic element because of its great strength and light |
| 871 | weight." |
| 872 | REM now do tungsten, 49 |
| 873 | DATA "This metallic element's symbol is W, atomic number 74." |
| 874 | DATA "This metallic element has the highest melting point, 3410 C." |
| 875 | DATA "This metallic element used in light bulbs is one of the transition elements." |
| 876 | DATA "__ carbide is extremely hard and is used as an abrasive." |
| 877 | REM now do uranium, 50 |
| 878 | DATA "This metallic element's symbol is U, atomic number 92." |
| 879 | DATA "A radioactive metallic element whose chief ore is pitchblend." |
| 880 | DATA "The 235 atomic weight isotope of this element is the only naturally occuring fission fuel." |
| 881 | DATA "An isotope of this naturally occuring metallic element is used in the atomic bomb." |
| 882 | REM now do vanadium, 51 |
| 883 | DATA "This metallic element's symbol is V, atomic number 23." |
| 884 | DATA "This metallic element beginning with a V is one of the hardest of all metals, it also takes a high |
| 885 | polish." |
| 886 | DATA "Because of its hardness and great tensile strength, this metal beginning with a V is used in many |
| 887 | alloys." |
| 888 | DATA "Vanadinite is an ore of this metallic element." |
| 889 | REM now do final element zinc, 52 |
| 890 | DATA "The symbol of this metallic element is Zn, its atomic number 30." |
| 891 | DATA "Spalerite is an important ore of this metallic element." |
| 892 | DATA "This metallic element is widely used as a coating to protect iron and steel from corrosion." |
| 893 | DATA "This metallic element is used in dry cell (non-alkaline) batteries." |
| 894 | DATA "Brass is made from copper and __. " |
| 895 | DATA "A member of group IIb of the periodic table, its name begins with Z." |
| 896 | DATA "A light member of group IIb which it shares with mercury and cadmium." |
| 897 | REM done all elements . . . |
| 898 | |

-continued

```
899    For j = 1 TO 52    'FOR 52 elements put clues into array aaaaaaaaaaaa
900    CLS
901    FOR K = 1 TO CLUENO(j)    'READ CLUES INTO ARRAY CLUE$(J,K)
902    READ CLUE$(j,K)
903    155  NEXT K
904    NEXT j
905    REM         finished reading clues into array aaaaaaaaa
906    REM NOW RANK ELEMENTS BY FREQUENCY FREQ() fffffffffffffffffffff
907    FOR j = 1 TO 51
908    J2 = j + 1
909    FOR K = J2 TO 52
910    IF (FREQ(j) > FREQ(k)) GOTO 1200    'SUCCESS
911    TEMP = FREQ(j)    'SWITCH FREQ()
912    FREQ(j) = FREQ(K)
913    FREQ(K) = TEMP    'DONE SWITCHING FREQ()
914    TEMP$ = ELEM$(j)    'NOW SWITCH ELEM$(J), ELEMENT NAMES
915    ELEM$(j) = ELEM$(K)
916    ELEM$(K) = TEMP$    'DONE SWITCHING ELEM$()
917    TEMP$ = ELAB$(j)    'NOW SWITCH ELAB$()- ELEM ABBREV.
918    ELAB$(j) = ELAB$(K)
919    ELAB$(K) = TEMP$
920    TEMP = CLUENO(j)    'NOW SWITH CLUENO()
921    CLUENO(j) = CLUENO(K)
922    CLUENO(K) = TEMP    'DONE SWITCHING CLUENO
923    FOR L = 1 TO 15    'NOW SWITCH CLUE$(,)
924    TEMP$ = CLUE$(j,L)
925    CLUE$(j,L) = CLUE$(K,L)
926    CLUE$(K,L) = TEMP$
927    NEXT L
928    1200 NEXT K
929    NEXT j
930    REM         FINISHED RANKING ELEMENTS BY FREQUENCY fffff
931    REM - NOW DO QUIZ ALGORITHM
932    REM 4/29/94 STEP 1 THE ARTICLES ARE RANKED ACCORDING TO THEIR IMPORTANCE
933    REM QUOTIENT. STEP 2 THEY ARE DIVIDED INTO 5 TIERS ACCORDING TO THEIR RANK
934    REM STEP 3 FROM THE FIRST (HIGHEST) TIER AN ARTICLE IS RANDOMLY SELECTED.
935    REM STEP 4 A NON-KEY CLUE IS RANDOMLY SELECTED FROM THE ARTICLE.
936    REM (THE KEY CLUE IS THE
937    REM KEY IDENTIFYING CLUE FOR THE ARTICLE. FOR EXAMPLE, FOR U.S. STATES IT
938    REM IS THEIR LOCATION. THERE IS ONE KEY CLUE FOR EACH ARTICLE.) IF THE CLUE
939    REM IS ANSWERED CORRECTLY, ADD FOUR POINT TO THE SCORE. IF NOT, RANDOMLY
940    REM SELECT ANOTHER NON-KEY CLUE. IF ANSWERED CORRECTLY, ADD TWO POINT TO
941    REM THE SCORE. IF NOT, GIVE THE KEY CLUE. IF ANSWERED CORRECTLY, ADD ONE
942    REM POINT TO THE SCORE. IF NOT, GIVE THE ANSWER.
943    REM REPEAT THE ABOVE PROCESS FOR THE REMAINING FOUR ARTICLES.
944    REM YOU HAVE NOW COMPLETED THE FIRST TIER
945    REM NOW REPEAT THE ENTIRE PROCESS FOR THE 2ND TIER THROUGH THE 5TH TIER.
946    REM
947    CLS
948    PRINT "TYPE Y IF YOU WANT SOUND EFFECTS"
949    INPUT Y$
950    MXX = 0
951    SCORE = 0
952    RANDOMIZE TIMER
953    IF (Y$ <> "Y" AND Y$ <> "y") GOTO 50
954    CORRECT$ = "O2 G8 G6 F10 E10 G8"    'IN THE MONEY SOUND STRING
955    WRONG$ = "O0 D-2"    "RASBERRY SOUND STRING
956    REM NOW SET DIFFICULTY LEVEL, H, M, OR L . . .
957    50 PRINT "INPUT THE DIFFICULTY LEVEL YOU'D LIKE TO BE ON"
958    PRINT "TYPE E FOR EASY LEVEL, M FOR MEDIUM LEVEL, H FOR HARD LEVEL"
959    INPUT DIFF$
960    DIFF$ = UCASE$(DIFF$)    'CONVERT TO UPPERCASE
961    IF (DIFF$ <> "H" AND DIFF$ <> "M" AND DIFF$    "E") THEN GOTO 50    'LEGAL
962    EL$ = "CARBON COPPER GOLD HYDROGEN IRON LEAD NITROGEN OXYGEN SILVER
963    SULFUR"
964    IF (DIFF$ <> "E") THEN EL$ = ""    'ELEMENT NAMES ON EASY LEVEL ONLY
965    IF (DIFF$ = "H") THEN LVL = 5 'HARD LEVEL DO 50 ELEMENTS
966    IF (DIFF$ = "M") THEN LVL = 3 'MEDIUM LEVEL DO 30 ELEMENTS
967    IF (DIFF$ = "E") THEN LVL = 1 'EASY LEVEL DO 10 ELEMENTS
968    IF (DIFF$ = "H") THEN ART = 5 'HARD LEVEL 5 Q/LEVEL
969    IF (DIFF$ = "M") THEN ART = 10 'MEDIUM LEVEL DO 10Q/LEVEL
970    IF (DIFF$ = "E") THEN ART = 30 'EASY LEVEL DO 30 Q FOR THE ONE LEVEL
971    REM FINISHED SETTING DIFFICULTY LEVEL . . .
972    FOR j = 1 TO LVL    'J IS THE TIER NO.
973    CLS
974    PRINT EL$
975    PRINT
976    FOR K = 1 TO ART 'DO ART NUMBER OF ARTICLES OUT OF EACH TIER
977    RAND = INT(10 * RND) + (J% - 1) * 10 + 1'PICKING RANDOM ARTICLE FROM TIER
978    REM PRINT "RAND=", RAND
```

-continued

```
979   CLUEZ = CLUENO(RAND)'CLUEZ IS THE NUMBER OF CLUES
980   REM PRINT "CLUEZ=", CLUEZ
981   505  RAND2 = INT((CLUEZ − 1) * RND) + 2'RND CLUE 2-N
982   IF (CLUE(RAND,RAND2) = 1) GOTO 505 'SKIP REPEATS
983   CLUE(RAND,RAND2) = 1    'REMEMBER YOU DID THIS CLUE
984   110 RAND3 = INT((CLUEZ − 1) * RND) + 2'RND CLUE 2-N DIFF FROM ABOVE
985   IF (RAND3 = RAND2) GOTO 100 'SKIP DUPLICATES
986   REM PRINT "RAND2=,RAND3=", RAND2, RAND3
987   PRINT CLUE$(RAND, RAND2)  'PRINT CLUE
988   PRINT "TYPE THREE LETTER ELEMENT ABBREVIATION"
989   INPUT ANS$  'INPUT 3 LETTER ANSWER
990   IF (UCASE$(ANS$) <> ELAB$(RAND)) GOTO 200   'FAILURE
991   PRINT "EXCELLENT, YOUR ARE CORRECT"
992   PLAY CORRECT$
993   PRINT
994   CLS
995   PRINT EL$
996   PRINT
997   SCORE = SOCRE + 4
998   GOTO 300
999   200 PRINT "SORRY, YOU ARE INCORRECT"
1000  PRINT
1001  PLAY WRONG$
1002  PRINT "HERE IS ANOTHER CLUE"
1003  PRINT CLUE$(RAND,RAND3)       'PRINT 2ND CLUE
1004  PRINT "TYPE IN 3 LETTER ELEMENT ABBREVIATION"
1005  INPUT ANS$
1006  IF (UCASE$(ANS$) <> ELAB$(RAND)) GOTO 250   'FAILURE
1007  PRINT "EXCELLENT, YOU ARE CORRECT"
1008  PLAY CORRECT$
1009  PRINT "TYPE ANY KEY TO CONTINUE"
1010  DO
1011  X$ = INKEY$
1012  LOOP UNTIL (X$ <> "")
1013  CLS
1014  PRINT EL$
1015  PRINT
1016  SCORE = SCORE + 2
1017  GOTO 300    'SUCCESS LOOP
1018  250 PRINT "SORRY, YOU ARE WRONG AGAIN"
1019  PRINT
1020  PLAY WRONG$
1021  PLAY WRONG$
1022  PRINT "HERE IS YOUR FINAL CLUE"
1023  PRINT CLUE$(RAND, 1) 'KEY IDENTIFYING CLUE
1024  INPUT ANS$
1025  IF (UCASE$(ANS$) <> ELAB$(RAND%)) GOTO 270   'FAILURE
1026  PRINT "GOOD JOB, YOU ARE CORRECT"
1027  PLAY CORRECT$
1028  PRINT "TYPE ANY KEY TO CONTINUE"
1029  DO
1030  X$ = INKEY$
1031  LOOP UNTIL (X$ <> "")
1032  CLS
1033  PRINT EL$
1034  PRINT
1035  SCORE = SCORE + 1
1036  GOTO 300
1037  270 PRINT "SORRY, YOU ARE WRONG AGAIN"
1038  PRINT
1039  PLAY WRONG$
1040  PLAY WRONG$
1041  PLAY WRONG$
1042  PRINT "THE CORRECT ANSWER IS", ELEM$(RAND)
1043  PRINT "THE CORRECT ABBREVIATON IS", ELAB$(RAND)
1044  PRINT "TYPE ANY KEY TO CONTINUE"
1045  DO
1046  X$ = INKEY$
1047  LOOP UNTIL (X$ <> "")
1048  300 MXX = MXX + 4
1049  CLS
1050  PC = 100 * (SCORE/MXX)
1051  PRINT "YOUR SCORE, PERCENT CORRECT IS", SCORE, PC
1052  PRINT
1053  PRINT
1054  PRINT
1055  PRINT EL$
1056  PRINT
1057  NEXT K
1058  PRINT
```

```
1059  PRINT
1060  PRINT
1061  NEXT j
1062  PRINT "YOUR FINAL SCORE, PERCENT CORRECT IS", SCORE, PC
1063  PRINT "TYPE ANY KEY TO EXIT"
1064  DO
1065  X$ = INKEY$
1066  LOOP UNTIL (X$ <> "")
1067  END
1068
1069
1070
```

What is claimed is:

1. An interactive educational apparatus comprising:
    a memory storing a reference database for use by a user of said interactive educational apparatus, said reference database being structured around a plurality of topics and including
        i) a plurality of pre-selected topics forming a reference source,
        ii) an objective rating assigned to each one of said topics, said objective rating being an objective measure of a difficulty or an importance of a corresponding one of said topics, and
        iii) a question/fact set assigned to each one of said topics,
    said memory also storing at least one educational module configured for interface between a user of said interactive educational apparatus and said reference database;
    a processor connected to said memory for executing said educational module;
    a display connected to said processor for displaying to a user of said interactive educational apparatus questions/facts selected from said question/fact set assigned to selected ones of said topics;
    an input device connected to said processor for communication between a user of said interactive educational apparatus and said processor;
    said educational module comprises processing instructions for said interface between a user of said interactive educational apparatus and said reference database, a selection command configured to randomly select from said reference source a topic corresponding to an objective rating or an objective rating tier, and a retrieval command configured to retrieve a question/fact from a question/fact set assigned to said topic selected by said selection command for display to a user of said interactive educational apparatus;
    wherein a topic corresponding to said objective rating or said objective rating tier is randomly selected by said selection command, a question/fact from a question/fact set corresponding to said topic selected by said selection command is retrieved by said retrieval command, and said question/fact retrieved by said retrieval command is displayed by said display to a user of said interactive educational apparatus.

2. The apparatus described in claim 1, wherein said educational module comprises a testing module configured for displaying to a user of said interactive educational apparatus a pre-determined number of said questions/facts and for monitoring responses of a user to said questions/facts, wherein said testing module comprises a scoring command for generating a score corresponding to the knowledge of the user of said topic selected by said selection command.

3. The apparatus described in claim 1, wherein said educational module comprises a learning module configured for displaying to a user of said interactive educational apparatus said questions/facts until a user terminates operation of said learning module, wherein said learning module comprises an answer command configured to display to the user a correct answer to said question/fact if said topic corresponding to said question/fact is not known by the user.

4. The apparatus described in claim 1, wherein said reference database also includes a classification assigned to each one of said topics to define groups of said topics, wherein said educational module further comprises a selection command configured to randomly select from said reference source a topic corresponding to said classification.

5. The apparatus described in claim 1, wherein said reference source is selected from a group consisting of a dictionary, an encyclopedia, and a textbook.

6. The apparatus described in claim 1, wherein said reference source is a dictionary and each one of said pre-selected topics comprises a dictionary word and a corresponding dictionary definition.

7. The apparatus described in claim 6, wherein said objective rating assigned to each one of said pre-selected topics is a frequency with which each said dictionary word occurs in a language sample.

8. The apparatus described in claim 6, wherein said question/fact set includes at least one multiple-choice question having plural incorrect selections and one correct selection, said correct selection being said dictionary definition corresponding to said dictionary word.

9. The apparatus described in claim 1, wherein said reference source is an encyclopedia and each one of said pre-selected topics is an encyclopedic article comprising an article title and article text.

10. The apparatus described in claim 9, wherein said objective rating assigned to each one of said pre-selected topics is a frequency with which each said article title, or a title corresponding to said article title, occurs in a language sample.

11. The apparatus described in claim 10, wherein said language sample is said encyclopedia.

12. The apparatus described in claim 9, wherein said question/fact set includes facts from said encyclopedic article, each said fact being a clue to said article title corresponding to each said fact.

13. The apparatus described in claim 12, wherein said question/fact set is a complete question/fact set covering all important facts from said encyclopedia article.

14. The apparatus described in claim 1, wherein said reference source is a textbook and each one of said pre-selected topics is a sub-division of said textbook.

15. The apparatus described in claim 14, wherein said objective rating assigned to each one of said pre-selected topics is a number of words dedicated to each said sub-division of said textbook.

16. The apparatus described in claim 14, wherein said question/fact set includes questions selected from a group consisting of multiple-choice questions, true-and-false questions, and fill-in-the-blank questions.

17. The apparatus described in claim 14, wherein said question/fact set a complete question/fact set covering all important facts from said sub-division of said textbook.

18. The apparatus described in claim 1, wherein said display is a CRT-type monitor connected to said processor.

19. The apparatus described in claim 1, wherein said input device is a keyboard connected to said processor.

20. An interactive educational apparatus for discovery learning by a user and for testing the knowledge of the user, said interactive educational apparatus comprising:

a memory storing a reference database for use by a user of said interactive educational apparatus for said discovery learning and said testing, said reference database being structured around a plurality of topics and including i) a plurality of pre-selected topics forming a reference source generally corresponding to a dictionary, an encyclopedia, or a textbook, ii) an objective rating assigned to each one of said pre-selected topics, said objective rating being an objective measure of a difficulty or an importance of a corresponding one of said pre-selected topics, iii) a question/fact set assigned to each one of said pre-selected topics, and iv) a classification assigned to each one of said pre-selected topics to define groups of said pre-selected topics;

said memory also storing a plurality of educational modules configured for interface between a user of said interactive educational apparatus and said reference database;

a processor connected to said memory for executing said educational modules;

a display connected to said processor for displaying to a user of said interactive educational apparatus questions/facts selected from said question/fact set assigned to selected ones of said pre-selected topics;

an input device connected to said processor for communication between a user of said interactive educational apparatus and said processor;

at least one of said educational modules being a testing module configured to test the knowledge of a user of said groups of said pre-selected topics, said testing module comprising a selection command configured to randomly select from said reference source a topic corresponding to an objective rating or an objective rating tier and corresponding to a classification, a retrieval command configured to retrieve a question/fact from a question/fact set assigned to said topic selected by said selection command for display to a user of said interactive educational apparatus, and a scoring command configured to generate a score corresponding to the knowledge of the user of said pre-selected topics; and at least one of said educational modules being a learning module configured for discovery learning by a user of said groups of said pre-selected topics, said learning module comprising a selection command configured to randomly select from said reference source a topic corresponding to an objective rating or an objective rating tier and corresponding to a classification, a retrieval command configured to retrieve a question/fact from a question/fact set assigned to said topic selected by said selection command for display to a user of said interactive educational apparatus, and an answer command configured to display to the user a correct answer to said question/fact if said topic corresponding to said question/fact is not known by the user.

21. The apparatus described in claim 20, wherein each one of said pre-selected topics comprises a dictionary word and a corresponding dictionary definition.

22. The apparatus described in claim 21, wherein said objective rating assigned to each one of said pre-selected topics is a frequency with which each said dictionary word occurs in a language sample.

23. The apparatus described in claim 21, wherein said question/fact set includes at least one multiple-choice question having plural incorrect selections and one correct selection, said correct selection being said dictionary definition corresponding to said dictionary word.

24. The apparatus described in claim 20, wherein each one of said pre-selected topics is an encyclopedic article comprising an article title and article text.

25. The apparatus described in claim 24, wherein said objective rating assigned to each one of said pre-selected topics is a frequency with which each said article title, or a title corresponding to said article title, occurs in a language sample.

26. The apparatus described in claim 25, wherein said language sample is said encyclopedia.

27. The apparatus described in claim 24, wherein said question/fact set includes facts from said encyclopedic article, each said fact being a clue to said article title corresponding to each said fact.

28. The apparatus described in claim 27, wherein said question/fact set is a complete question/fact set covering all important facts from said encyclopedic article.

29. The apparatus described in claim 20, wherein each one of said pre-selected topics is a sub-division of said textbook.

30. The apparatus described in claim 29, wherein said objective rating assigned to each one of said pre-selected topics is a number of words dedicated to each said sub-division of said textbook.

31. The apparatus described in claim 29, wherein said question/fact set includes questions selected from a group consisting of multiple-choice questions, true-and-false questions, and fill-in-the-blank questions.

32. The apparatus described in claim 29, wherein said question/fact set is a complete question/fact set covering all important facts from said sub-division of said textbook.

33. The apparatus described in claim 20, wherein said display is a CRT-type monitor connected to said processor.

34. The apparatus described in claim 20, wherein said input device is a keyboard connected to said processor.

35. An interactive educational apparatus for discovery learning by a user and for testing the knowledge of the user, said interactive educational apparatus comprising:

a memory storing a reference database for use by a user of said interactive educational apparatus for said discovery learning and said testing, said reference database being structured around a plurality of topics and including i) a plurality of pre-selected topics forming a reference source generally corresponding to a dictionary, each one of said pre-selected topics including a dictionary word and a corresponding dictionary definition, ii) an objective rating assigned to each one of said pre-selected topics, said objective rating being a frequency with which said dictionary word occurs in a language sample, iii) a question/fact set assigned to each one of said pre-selected topics, iv) a classification assigned to each one of said pre-selected topics to define groups of said pre-selected topics; and v) supplemental information assigned to each one of said pre-selected topics for discovery learning of said pre-selected topics;

said memory also storing a plurality of educational modules configured for interface between a user of said interactive educational apparatus and said reference database;

a processor connected to said memory for executing said educational modules;

a display connected to said processor for displaying to a user of said interactive educational apparatus questions/facts selected from said question/fact set assigned to selected ones of said pre-selected topics;

an input device connected to said processor for communication between a user of said interactive educational apparatus and said processor;

at least one of said educational modules being a testing module configured to test the knowledge of a user of said groups of said pre-selected topics, said testing module comprising a selection command configured to randomly select from said reference source a topic corresponding to an objective rating or an objective rating tier and corresponding to a classification, a retrieval command configured to retrieve a question/fact from a question/fact set assigned to said topic selected by said selection command for display to a user of said interactive educational apparatus, and a scoring command configured to generate a score corresponding to the knowledge of the user of said pre-selected topics; and at least one of said educational modules being a learning module configured for discovery learning by a user of said groups of said pre-selected topics, said leaning module comprising a selection command configured to randomly select from said reference source a topic corresponding to an objective rating or an objective rating tier and corresponding to a classification, a retrieval command configured to retrieve a question/fact from a question/fact set assigned to said topic selected by said selection command for display to a user of said interactive educational apparatus, an information command configured to display to the user at least a portion of said supplemental information assigned to said topic, and an answer command configured to display to the user a correct answer to said question/fact if said topic corresponding to said question/fact is not known by the user.

36. The apparatus described in claim 35, wherein said question/fact set includes at least one multiple-choice question having plural incorrect selections and one correct selection, said correct selection being said dictionary definition corresponding to said dictionary word.

37. The apparatus described in claim 35, wherein said display is a CRT-type monitor connected to said processor.

38. The apparatus described in claim 35, wherein said input device is a keyboard connected to said processor.

39. An interactive educational apparatus for discovery learning by a user and for testing the knowledge of the user, said interactive educational apparatus comprising:

a memory storing a reference database for use by a user of said interactive educational apparatus for said discovery learning and said testing, said reference database being structured around a plurality of topics and including i) a plurality of pre-selected topics forming a reference source generally corresponding to an encyclopedia, each one of said pre-selected topics including an article title and article text, ii) an objective rating assigned to each one of said pre-selected topics, said objective rating being a frequency with which each said article title, or a title corresponding to said article title, occurs in a language sample, iii) a question/fact set assigned to each one of said pre-selected topics, iv) a classification assigned to each one of said pre-selected topics to define groups of said pre-selected topics; and v) supplemental information assigned to each one of said pre-selected topics for discovery learning of said pre-selected topics;

said memory also storing a plurality of educational modules configured for interface between a user of said interactive educational apparatus and said reference database;

a processor connected to said memory for executing said educational modules;

a display connected to said processor for displaying to a user of said interactive educational apparatus questions/facts selected from said question/fact set assigned to selected ones of said pre-selected topics;

an input device connected to said processor for communication between a user of said interactive educational apparatus and said processor;

at least one of said educational modules being a testing module configured to test the knowledge of a user of said groups of said pre-selected topics, said testing module comprising a selection command configured to randomly select from said reference source a topic corresponding to an objective rating or an objective rating tier and corresponding to a classification, a retrieval command configured to retrieve a question/fact from a question/fact set assigned to said topic selected by said selection command for display to a user of said interactive educational apparatus, and a scoring command configured to generate a score corresponding to the knowledge of the user of said pre-selected topics; and at least one of said educational modules being a learning module configured for discovery learning by a user of said groups of said pre-selected topics, said learning module comprising a selection command configured to randomly select from said reference source a topic corresponding to an objective rating or an objective rating tier and corresponding to a classification, a retrieval command configured to retrieve a question/fact from a question/fact set assigned to said topic selected by said selection command for display to a user of said interactive educational apparatus, an information command configured to display to the user at least a portion of said supplemental information assigned to said topic, and an answer command configured to display to the user a correct answer to said question/fact if said topic corresponding to said question/fact is not known by the user.

40. The apparatus described in claim 39, wherein said language sample is said encyclopedia.

41. The apparatus described in claim 39, wherein said question/fact set includes facts from said article text, each said fact being a clue to said article title corresponding to each said fact.

42. The apparatus described in claim 41, wherein said question/fact set is a complete question/fact set covering all important facts from said article text.

43. The apparatus described in claim 39, wherein said display is a CRT-type monitor connected to said processor.

44. The apparatus described in claim 39, wherein said input device is a keyboard connected to said processor.

45. An interactive educational apparatus for a user comprising:
- a memory storing a reference database structured around topics and including
  - i) a plurality of topics forming a reference generally corresponding to a textbook, each said topic being a sub-division of said textbook,
  - ii) an objective rating assigned to each said topic, wherein said objective rating is a number of words dedicated to each said topic,
  - iii) a question/fact set for each of at least a portion of said topics,
  - iv) a classification assigned to each one of said topics to define groups of said topics, and
  - v) supplemental information assigned to each one of said topics for discovery learning of said topics;
- said memory also storing a plurality of educational modules, said educational modules configured for interface between a user and said reference database;
- a processor connected to said memory for executing said educational modules;
- a display connected to said processor for displaying to a user questions/facts selected from said question/fact set assigned to selected ones of said topics;
- an input device connected to said processor for communication between a user and said processor;
- at least one of said educational modules being a testing module configured to test the knowledge of a user of said groups of said topics, said testing module comprising a selection command configured to randomly select from said reference a topic corresponding to an objective rating or an objective rating tier and corresponding to a classification, a retrieval command configured to retrieve a question/fact from a question/fact set assigned to said topic selected by said selection command for display to a user of said interactive educational apparatus, and a scoring command configured to generate a score corresponding to the knowledge of the user of said topics; and
- at least one of said educational modules being a learning module configured for discovery learning by a user of said groups of said topics, said learning module comprising a selection command configured to randomly select from said reference a topic corresponding to an objective rating or an objective rating tier and corresponding to a classification, a retrieval command configured to retrieve a question/fact from a question/fact set assigned to said topic selected by said selection command for display to a user of said interactive educational apparatus, an information command configured to display to the user at least a portion of said supplemental information assigned to said topic, and an answer command configured to display to the user a correct answer to said question/fact if said topic corresponding to said question/fact is not known by the user.

46. The apparatus described in claim 45, wherein said reference database also includes a classification assigned to each said topic.

47. The apparatus described in claim 45, wherein said educational module contains processing instructions for said processor to facilitate said interface.

48. The apparatus described in claim 45, wherein said question/fact set includes questions selected from a group consisting of multiple-choice questions, true-and-false questions, and fill-in-the-blank questions.

49. The apparatus described in claim 48, wherein said question/fact set is a complete question/fact set covering all important facts from said sub-division of said textbook.

* * * * *